(12) United States Patent
Brine et al.

(10) Patent No.: US 9,377,374 B2
(45) Date of Patent: Jun. 28, 2016

(54) LEAK TESTING METHODS AND SYSTEMS

(71) Applicant: Sciemetric Instruments Inc., Kanata (CA)

(72) Inventors: Richard Michel Brine, Ottawa (CA); Nathan Bernard Sheaff, Kanata (CA)

(73) Assignee: Sciemetric Instruments Inc., Ottawa (CA)

( * ) Notice: Subject to any disclaimer, the term of this patent is extended or adjusted under 35 U.S.C. 154(b) by 536 days.

(21) Appl. No.: 13/910,375

(22) Filed: Jun. 5, 2013

(65) Prior Publication Data

US 2013/0325371 A1    Dec. 5, 2013

Related U.S. Application Data

(60) Provisional application No. 61/655,624, filed on Jun. 5, 2012.

(51) Int. Cl.
   *G01M 3/26* (2006.01)
   *G05D 7/06* (2006.01)

(52) U.S. Cl.
   CPC ............... *G01M 3/26* (2013.01); *G05D 7/0629* (2013.01)

(58) Field of Classification Search
   CPC ........ G01M 3/26; G01M 3/32; G05D 7/0629; G01F 25/00; G01N 15/0826
   USPC ............... 702/45, 47, 50, 51; 73/40.5 A, 861; 700/282
   See application file for complete search history.

(56) References Cited

U.S. PATENT DOCUMENTS

| 6,212,942 | B1 * | 4/2001 | Hara | G01M 3/24 73/40.5 A |
| 2004/0255689 | A1 * | 12/2004 | Murray | G01M 3/26 73/861 |
| 2013/0325194 | A1 * | 12/2013 | Brine | G01M 3/26 700/282 |

* cited by examiner

*Primary Examiner* — John H Le
(74) *Attorney, Agent, or Firm* — Nixon Peabody LLP

(57) ABSTRACT

Leak rate testing is an engineering challenge where on the one hand, engineers must meet strict leak rate standards on a wide range of products and systems from semiconductor packages through medical product packaging to chemical storage vessels and liquid/gas handling systems. On the other hand, they have to make the leak testing process low cost and independent of operator whilst in many applications making the process automated and fast as this step may otherwise become a manufacturing bottleneck. Accordingly embodiments of the invention address manufacturing requirements by providing for high accuracy flow based leak testing of large volumes, providing adaptive techniques for use during testing, providing equivalent circuit modeling techniques allowing optimization and parameter extraction to be simulated prior to manufacturing commitment, and providing for the automatic tuning of setup parameters.

12 Claims, 15 Drawing Sheets

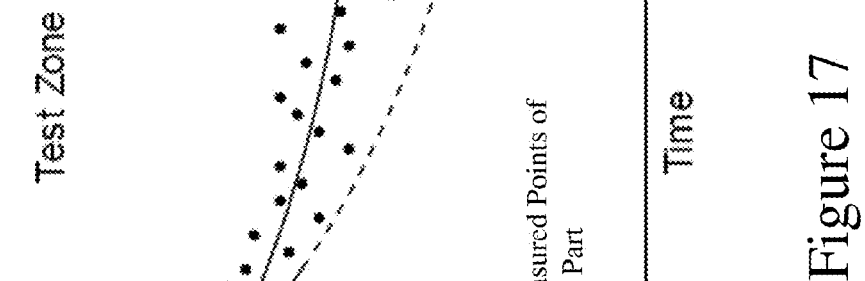
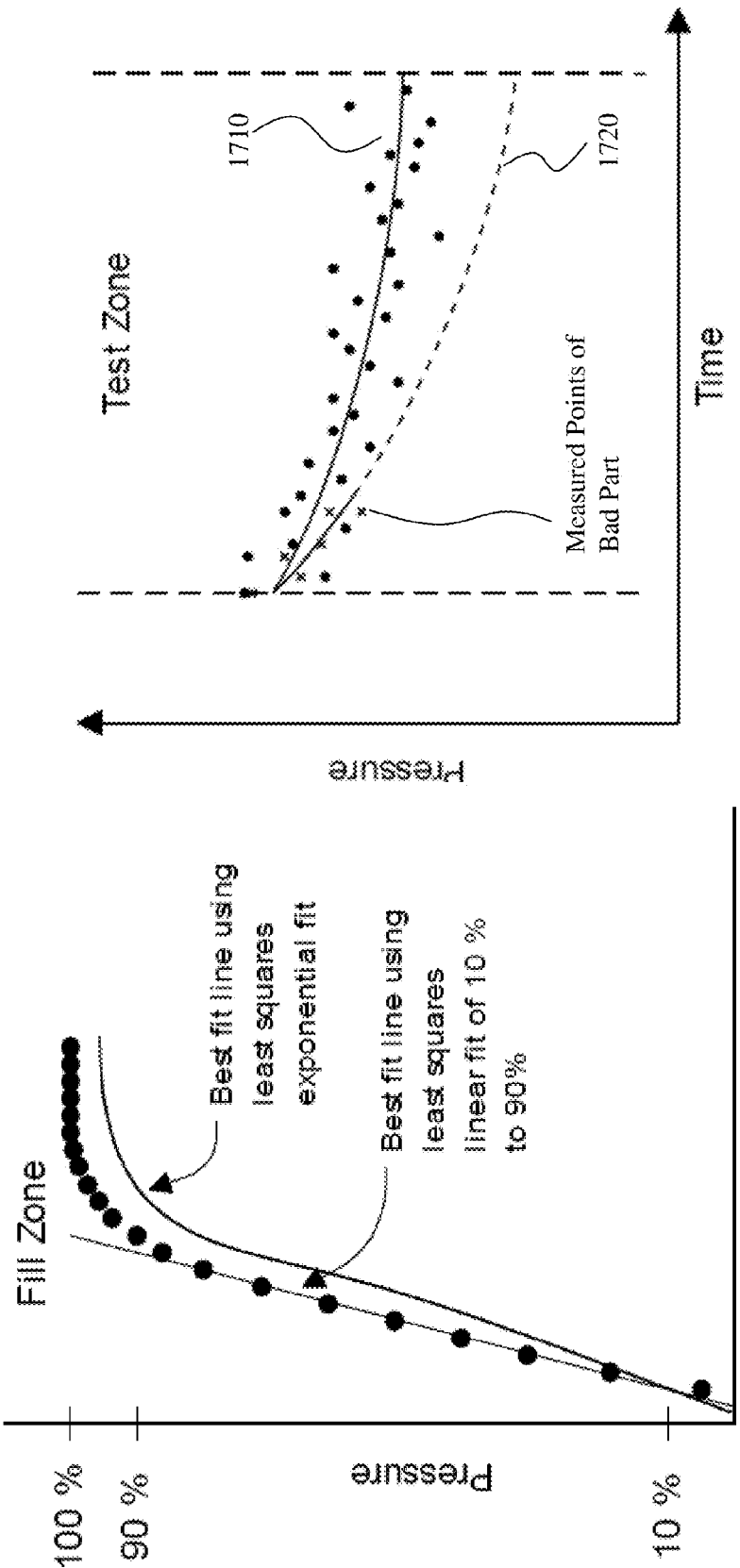
Figure 17
Figure 16

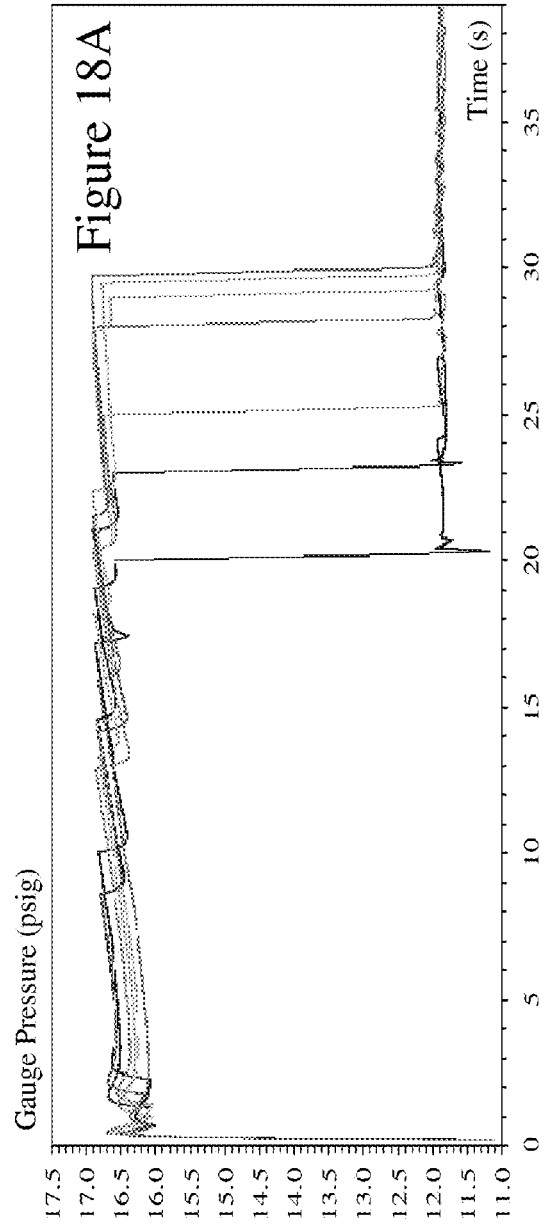
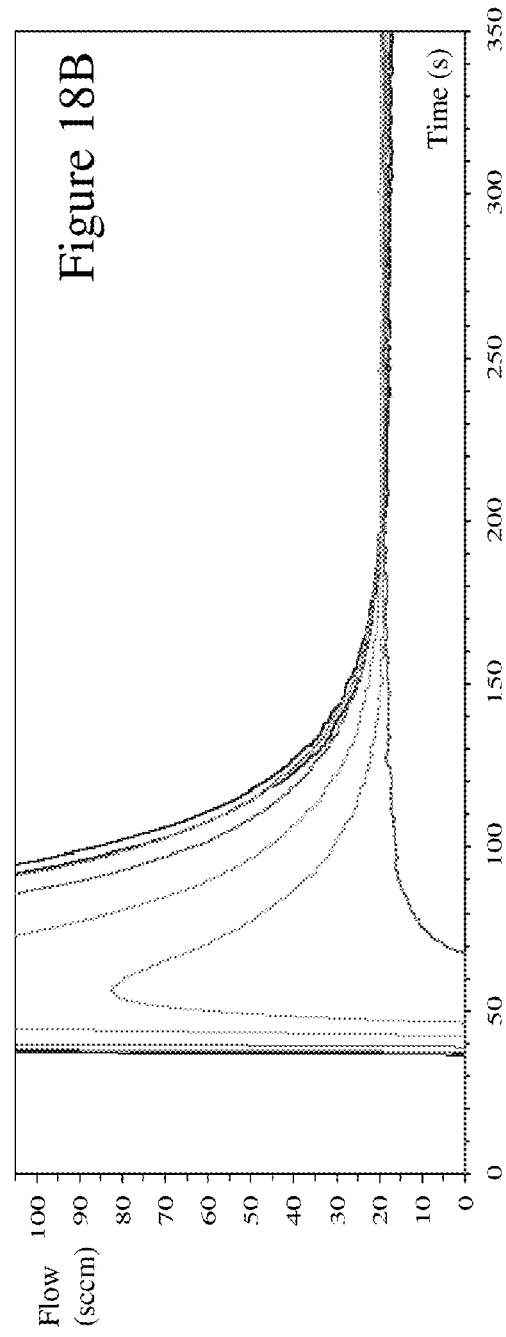

LEAK TESTING METHODS AND SYSTEMS

CROSS-REFERENCE TO RELATED APPLICATIONS

This patent application claims the benefit of U.S. Provisional Patent Application U.S. 61/655,624 filed Jun. 5, 2012 entitled "Methods and Systems for Leak Testing", the entire contents of which are included by reference.

FIELD OF THE INVENTION

The present invention relates to leak testing and more specifically to enhancing accuracy, speed and defect detection.

BACKGROUND OF THE INVENTION

Leak rate testing is an engineering challenge where on the one hand, engineers must meet strict leak rate standards on a wide range of products and systems from semiconductor packages through medical product packaging to chemical storage vessels and liquid/gas handling systems. On the other hand, they have to make the leak testing process low cost and independent of operator whilst in many applications making the process automated and fast as this step may otherwise become a manufacturing bottleneck. To address these conflicting demands engineers must understand all aspects of the leak testing process. It is also important that it is understood what a product leak is. This common term is not always well defined but is basically a material flow from or into a product (a control volume) within a predetermined period of time which is in excess of an allowable limit. Product leaks are typically caused by open flow paths, such as pinholes, broken seals or material porosity and in most cases the product leak is a very small flow. It is this process of quantifying a product leak and eliminating products based upon the measured leak that is known as leak testing. In the pharmaceutical, medical, and food industries, it is called package or seal integrity testing.

Leak testing requires the accurate measurement of very small flow rates of a gas or liquid within what may in some instances be made for a large volume or in others rapidly. Typically measured as a flow rate, such as standard cubic centimeters per minute (sccm) or cubic centimeters of helium per second (cc/s He) and millibar liters per second (mbar.l/s) and may, according to application, range from $10^{-3}$ to $10^{-12}$ mbar.l/s. In some cases, the leak flow rate is correlated to a "virtual pinhole," to quantify the size of potential defects. For example, to prevent contamination, a sterilized medical package must be sealed such that a "virtual pinhole" in the product is smaller than the size of the smallest microorganism (commonly 0.2 μm in diameter). This theoretical pinhole dimension and the leak flow rate are correlated to each other.

Irrespective of the actual component, device, product and/or system being leak tested the balance of speed, accuracy, and cost exists. Whilst increased speed (reduced time) of leak testing reduces cost per unit a corresponding reduction in accuracy from this may lead to increased costs from yield (as rejections may actually have passed with an increased accuracy test) and/or product failures and customer impact (as products failing at the customer which were incorrectly passed impact yield, customer satisfaction, and in critical cases may lead directly to damages payable by the manufacturer. Accordingly there is considerable benefit to manufacturers in increasing accuracy, increasing speed, and increasing defect detection in manufacturing leak testing.

Additionally some scenarios present further issues, such as for example large volume leak testing. Leak testing with large part volumes in the 30 L (~7.9 gallons) and above range, creates additional challenges including temperature sensitivity and pressure sensitivity. Take the example of a 77 L part, approximately 19 gallons, then a conventional flow based leak test would uses a flow meter in series with a pressure regulator such as shown in FIG. 1. The Test Pressure Regulator R2 115 keeps the pneumatic pressure at the desired test pressure and the Flow Sensor F1 130 measures the flow to the Device under Test (DUT) 140. The test pressure regulator 115 is typically vented to atmospheric and this forms the basis for the test pressure. For example if the atmospheric pressure is 14.7 psi and the regulator is set to 7.5 psi the absolute test pressure is (14.7+7.5)=22.2 psi. Accordingly as the atmospheric pressure varies so does the absolute output pressure of the regulator.

Referring to Table 1 there is shown the resulting flow measurement if the part volume is 77 L and the atmospheric pressure varies by 0.002 psi. The flow meter will have to allow 6.9 cc to flow in order to allow the test chamber pressure to change. This is a large error if the goal is to read down to flow rates of 2 sccm reliably.

TABLE 1

Calculation of Volume Change due to Atmospheric Pressure Change

| Description | Value | Unit |
| --- | --- | --- |
| Atmospheric Pressure Change | 0.002 | psi |
| Volume of Part | 77 | L |
| Test Pressure | 7.5 | psi |
| P absolute | 14.7 | psi |
| Volume Change due to Atmospheric Pressure Change | 6.9 | Cc |

As depicted in FIG. 1 the Test Pressure Regulator R2 115 and Flow Sensor F1 130 form part of an overall pneumatic circuit with DUT 140. Air is coupled from a source, commonly referred to as the shop air, filtered with filter 105 and pressure regulated with Regulator R1 110 before being coupled to the Test Pressure Regulator R2 115. The output of the Test Pressure Regulator R2 115 is coupled to the Flow Sensor F1 130 via Supply Valve V3 120 and Flow Test Valve 125 and therein after the Flow Sensor 130 to DUT 140 wherein an Absolute Pressure Sensor P1 135 is also coupled together with a Calibration Orifice 145 allowing calibration to be performed via a non-return valve. The output of the Supply Valve V3 120 is also coupled to Fill Valve V1 150 and Exhaust Valve V2 155 which is also coupled to the output of the Flow Sensor 130 and Exhaust 160.

Accordingly through the appropriate sequencing of these valves the DUT 140 may be filled, pressurized and tested before being exhausted to air for de-coupling and another DUT 140 attached. Referring to FIG. 2 the resulting flow output (sccm) and ambient pressure (×2000 and DC removed) are depicted for such a DUT with volume 77 L over a period of 2000 seconds.

Such issues combined with the continued drive for more accurate leak test results, due to increased attention to quality, means that new control/measurement techniques are required. Accordingly embodiments of the invention address manufacturing requirements by providing for high accuracy flow based leak testing of large volumes, providing adaptive techniques for use during testing, providing equivalent circuit modeling techniques allowing optimization and parameter extraction to be simulated prior to manufacturing commitment, and providing for the automatic tuning of setup parameters.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to enhance leak testing and more specifically to enhancing accuracy, speed and defect detection.

In accordance with an embodiment of the invention there is provided a method of leak testing a device under test (DUT) comprising the steps of:
a) filling the DUT with a fluid to a predetermined pressure using a first regulator R2 and first valve V1 disposed in series between a source of the fluid and the DUT via a first process sequence comprising a first set of characteristics;
b) measuring with a high accuracy flow controller F1 a measured flow waveform via a second process sequence comprising a second set of characteristics; and
c) calculating with a microprocessor a leak rate for the DUT in dependence upon at least the measured flow waveform.

In accordance with an embodiment of the invention there is provided a method of testing a device under test (DUT) comprising:
a) establishing a leak test protocol comprising at least a first set of characteristics related to at least one of a filling and stabilization process, a second set of characteristics related to a testing process, and a third set of chracteristics relating to an exhaust process;
b) preparing the DUT with a fluid to a predetermined pressure using a first regulator R2 and first valve V1 disposed in series between a source of the fluid and the DUT via a first process sequence comprising the first set of characteristics;
c) measuring with a high accuracy flow controller F1 a measured flow waveform via a second process sequence comprising the second set of characteristics;
d) performing an exhaust process to allow replacement of the DUT; and
e) calculating with a microprocessor a leak rate for the DUT in dependence upon at least the measured flow waveform.

In accordance with an embodiment of the invention there is provided a method comprising:
providing a leak testing pneumatic circuit comprising at least an inlet for connection to a source of fluid, a pressure regulator, a first valve coupled to the regulator and a second valve, a pressure sensor coupled to the output of the second valve, and an outlet coupled to the output of the second valve for coupling to the DUT;
executing a leak test sequence for a DUT by cycling the first and second valves through a predetermined sequence to selectively perform at least one of a system check, a filling step, a stabilization step, a testing step, and an exhaust step; wherein
the output of the pressure sensor is continuously acquired by a microprocessor to perform a full flow waveform analysis as part of a quality assurance step for the DUT.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 16 depicts fitting a model to the fill portion of the pressure curve according to an embodiment of the invention;

FIG. 17 depicts early DUT rejection with signature analysis according to an embodiment of the invention; and FIGS. 18A and 18B depict stabilization reduction using overpressure, showing pressure and flow curves respectively according to an embodiment of the invention.

DETAILED DESCRIPTION

Figure 1:
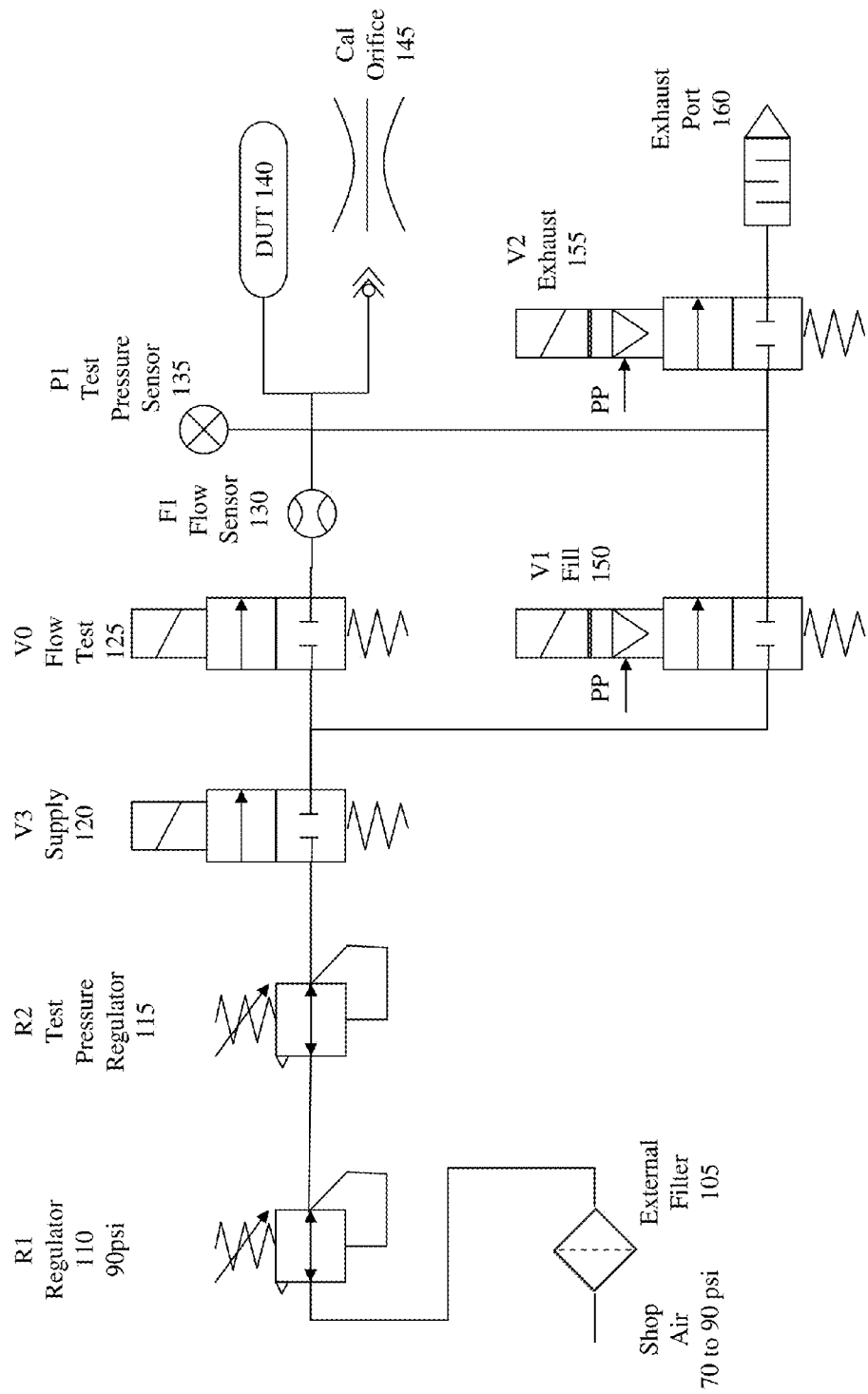
FIG. 1 depicts a large volume leak rate test system according to the prior art.
Figure 2:
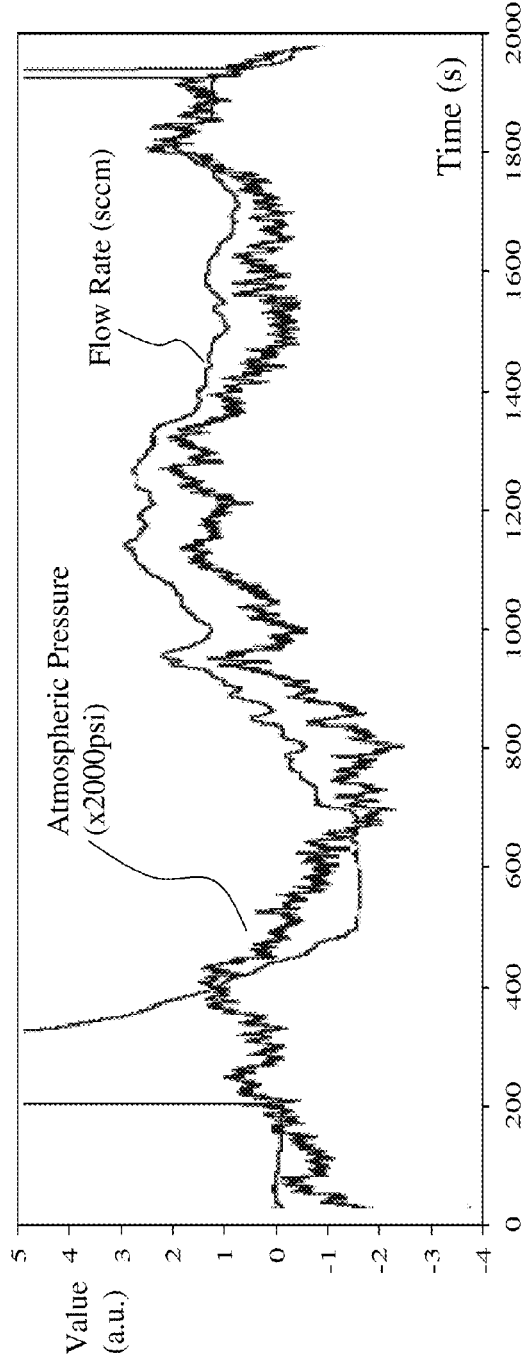
FIG. 2 depicts the flow output (sccm) and ambient pressure (×2000 and DC removed) for a 77 L test part over a period of 2000 seconds.

The present invention is directed to leak testing and more specifically to enhancing accuracy, speed and defect detection.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "device under test" (DUT) as used herein and throughout this disclosure, refers to an item being tested for a leak. This includes, but is not limited to, devices, components, packages, packaging, containers, piping systems, individual elements, sub-systems and systems requiring that they isolate the interior from the ambient exterior. A DUT may or may not be intended to form part of a hydraulic, pneumatic, or fluidic system.

A "leak test" as used herein and throughout this disclosure, refers to process and/or method of determining whether a DUT has a leak which may for example comprise placing the DUT under a positive pressure relative to its environment and determining attributes of the pressure/flow to determine the rate of leakage from the DUT. However, leak test as used herein is not limited to positive pressure testing and may include, but not be limited to, negative pressure leak testing wherein DUTs cannot be placed under positive pressure and helium leak testing. Such testing may be performed with a fluid including for example air, nitrogen, helium and other gases as well as water, silicone oil, and other liquids.

Traditionally leak testing was performed by using immersion testing or sniffing. In the former the DUT would be immersed into liquid and leaks identified by observing bubbles. Such testing was good for gross leaks in mechanical systems but is limited where very low leak rates are required as such leak rates imply very long bubble formation. Additionally in many instances an inert material would have to be employed in order not to damage the actual components under test. Sniffing in contrast comprised pressurizing a DUT with a material not present in the normal environment, typically helium gas, and using a sensor to identify the presence of helium external to the DUT. However, this again was generally qualitative and for large systems required an operator to physically move the sniffer along and around the DUT. For small packages such as within electronics and opto-electronics variations of this evolved to measuring the helium within a chamber held under vacuum with the DUT inside.

Such helium leak rate testing falls into a category of testing commonly known as "amount of leak methods" which includes hard vacuum inside/out; hard vacuum outside/in; accumulation; carrier gas; mass flow; and Residual Gas Analysis which provide together measurable leak rates as low as $10^{-9}$ std. cc/sec although some such as mass flow provide limited dynamic ranges to approximately $10^{-2}$ std. cc/sec when compared to others such as hard vacuum. Another category of techniques are the "effect of leak methods" which involve measuring the effect the leak has on some physical quantity or quantities inside or around the DUT. In the majority of cases this quantity is pressure. Such techniques include pressure decay, pressure differential, pressure increase, and vacuum delay and offer measurable leak rates down to approximately $10^{-3}$ std. cc/sec.

Within the following sections different approaches to enhancing accuracy, speed and defect detection for leak rate testing are identified according to embodiments of the invention. Whilst such approaches may be discussed in respect of one particular leak rate test methodology it would be evident to one skilled in the art that such approaches may be applied to other methodologies without departing from the scope of the invention.

1. Software Correction: Measurements of characteristics of sensors are performed and employed within an algorithm to compute a corrective waveform and/or corrective coefficient used to determine the true flow and remove errors induced by various factors present within the measurement system. For example a method according to an embodiment of the invention may comprise the steps of:

1. Measure pressure with an absolute pressure sensor with high resolution to generate an absolute pressure waveform;
2. Compute the derivative of the absolute pressure waveform;
3. Compute an effective flow due to the absolute pressure change waveform using the data obtained from the absolute pressure sensor in dependence upon the known DUT volume and absolute pressure, see for example Equation (1);
4. Subtract this effective flow from the measured flow waveform;
5. Measure corrected, real, flow due to leak(s).

$$Flow_{CORR} = \frac{Vol}{P_A} \times \frac{\delta P_A}{\delta t} \qquad (1)$$

2. Absolute Pressure Control: According to this embodiment of the invention a control method on the flow to keep the absolute pressure constant wherein a feedback controller, such as a Proportional-Integration-Derivative (PID) controller, is employed to actively control the flow going into the DUT to keep the absolute pressure constant. The resulting flow value is the true leak rate of the DUT.

Figure 3:
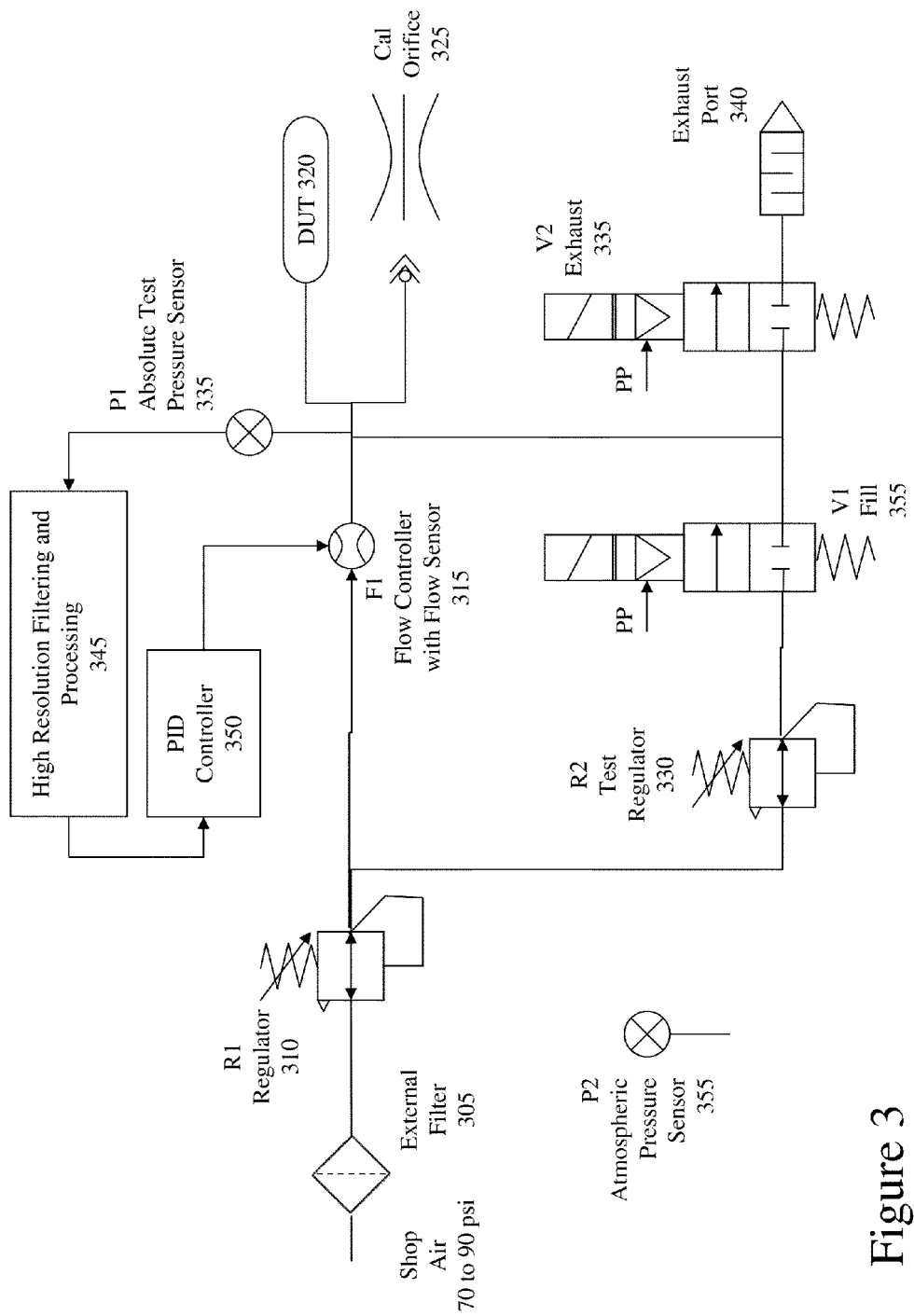
FIG. 3 depicts a large volume leak rate test system according to an embodiment of the invention.

An example of a pneumatic electrical circuit providing such active control according to an embodiment of the invention is depicted in FIG. 3. The main elements of this circuit being:

1. P1 absolute test pressure sensor 335;
2. Feeding the output of the P1 absolute test pressure sensor 335 into a high resolution low noise data acquisition input circuit with software based processing, depicted as High Resolution Filtering and Processing 345;
3. A high accuracy flow controller and flow sensor 315 replaces the flow meter, typically with limited flow; and
4. A PID controller 350 controls the high accuracy flow controller with flow sensor 315 to control the flow based on the processed output of the absolute pressure sensor 335.

Accordingly an exemplary manufacturing leak test process sequence using the pneumatic electrical circuit of FIG. 3 would proceed as follows:

1. Fill the DUT with the R2 regulator through V1 Fill 355 to get the part to the desired test pressure;
2. Wait a predetermined period of time to allow the DUT to stabilize;
3. Perform a high resolution measurement of the absolute test pressure using P1 absolute test pressure sensor 335 and use this as the set point for the subsequent steps below;
4. Close V1 Fill 355;
5. Engage the PID controller 350 to close the loop and keep the test pressure at the value determined in step 3 within the accuracy of electronic circuit comprising High Resolution Filtering and Processing 345 and PID controller 350;
6. Measure the resulting control flow signal and determine the DUT leak from this value with any required signal processing.

Embodiments of the High Resolution Filtering and Processing 345 by the inventors achieve a resolution of approximately $25 \times 10^{-6}$ psi thereby allowing the PID controller 350 to close the feedback loop and maintain the pressure constant to within this resolution.

Stabilization Step Removal: One of the longest delays in leak testing is the stabilization phase. In this phase the heat that has been added to the air adiabatically through the compression of the air inside the DUT during the fill portion of the leak test is dissipating into the inside surface of the DUT. As this air inside the DUT cools back down to the inside surface temperature the pressure in the DUT drops in a pressure decay test or an increase flow is measured in a flow based test. This process can take time and is controlled by the physical characteristics of the inside of the DUT including volume of air, inside surface area, inside surface geometry and inside surface finish.

An issue with absolute pressure regulation is the signal to noise ratio as anything that decreases this will aid in decreasing the stability of the absolute pressure and thus the stability and accuracy of the leak test results. Highest resolution can be obtained by using a differential pressure transducer between a reference vessel and the DUT. In a method according to an embodiment of the invention the reference volume would be filled to the same pressure as the DUT test pressure then sealed off. The control algorithm, for example PID, would then act to close the pressure regulation loop based upon the difference between this reference volume and the DUT. Accordingly, the differential pressure sensor can have a very low full scale range, for example 0.1 psi thereby giving the control electronics a large signal to noise ratio and resulting in increased stability of establishing an absolute pressure.

An exemplary sequence of events according to an embodiment of the invention being:
1. Using a gauge fast fill regulator fill the DUT and the reference volume to the same pressure.
2. Seal the reference volume so that it does not change in pressure.
3. Employ a low full scale differential pressure sensor that measures the pressure difference between the reference volume and the DUT.
4. Switch control to a fine regulator that is under a control loop with the differential pressure sensor as the feedback input and a value of zero as the set point input.
5. Now the control algorithm has a large signal to noise ratio input and can control the pressure with greater accuracy.

3. Multi-Stage Pressure Control to Optimize Fill Time: Amongst the factors affecting overall cost of leak testing is equipment utilization wherein reducing overall test time increases this metric for a manufacturing process step. Accordingly, a multi-stage active control algorithm according to embodiments of the invention allows an optimization of the fill process which may be partitioned for example into a fast fill stage, an adiabatic stabilization stage, and test time. Each phase benefits from unique control parameters which may vary according to the characteristics of the DUT.

According to embodiments of the invention such a multi-stage fill may employ, such as described above, multiple flow controllers with flow sensors which are controlled from PID controllers which each execute individual PID algorithms coupled from digital processing circuits, such as High Resolution Filtering and Processing 345, which receive the output of an absolute test pressure sensor. Alternatively multiple PID controllers may receive their input from a single digital processing circuit or a single PID controller and flow controller with flow sensor may be used wherein the PID algorithm changes for each stage based upon predetermined conditions being met. Accordingly, each PID algorithm allows for actively setting the unique optimal gains for each phase of the leak test.

Stabilization Step Removal: As discussed supra in respect of Section 2 one of the longest delays in leak testing is the stabilization phase. According to an embodiment of the invention the fill pressure is modified to increase the rate at which the heat is transferred out of the air inside the DUT to the inside surface of the DUT. The time taken by the stabilization phase is the time it takes to remove all the added heat due to the adiabatic process. By temporarily increasing the pressure in the DUT for a period of time the rate of heat transfer can be increased, thus reducing the overall time to finish the stabilization phase. Referring to FIG. 18A there are shown various times of this over-pressure stage from 20 seconds to 30 seconds.

FIG. 18B shows the resulting flow curves. Referring to curve 1215100084 then there is shown a time of 29.5 seconds where the flow is stable at 195 seconds other if over pressure is not used the stabilization takes over 255 seconds.

Method 1: An exemplary sequence of events may therefore include:
1. Overfill the part to a pressure that is higher than the final required test pressure.
2. Keep this higher pressure until all of the heat required at the lower pressure has been transferred, this may be determined through experimentation or automatically through automatic algorithms such as described within this specification.
3. Reduce the pressure to the required test pressure.
4. Wait the shorter period of time for final stabilization.
5. Measure the leak now at the earlier point in time.

Method 2: Similar to Method 1 above but the fill pressure is modified dynamically in an adaptive loop that monitors the current adiabatic rate of heat transfer and modifies the pressure dynamically in a control loop to achieve the fastest stabilization. The control algorithm would set the pressure high then monitor the effective flow rate of change, for example, and then modify the pressure to arrive at zero flow rate of change at the desired test pressure with stabilization complete where the flow is stable and not changing.

An exemplary sequence of events may therefore include:
1. Overfill the part to a pressure that is higher than the final required test pressure.
2. In a control loop monitor the rate of change of the flow due to stabilization heat transfer, adjust the pressure from over fill pressure to test pressure using the stabilization flow as the input.
3. Control the pressure to arrive at the test pressure with a flow rate of change of zero.
4. Wait a shorter period of time for final stabilization.
5. Measure the leak now at the earlier time 4. Absolute Pressure Regulation: Flow based leak testing techniques according to the prior art exploit gauge pressure regulators wherein the absolute output pressure of the regulator varies with the absolute atmospheric pressure. According to embodiments of the invention such gauge pressure regulators are replaced by absolute pressure regulators such that increase flow based leak detection accuracy is obtained by removing the error induced in leak testing due to atmospheric pressure changes.

5. Multi-Stage Pressure Control: According to this embodiment of the invention increased accuracy and reduced detection time are provided through the application of a multi-stage pressure control methodology. Such an approach being beneficial to achieve high precision leak accuracy in large volume leak testing.

Accordingly, multi-stage electronic pressure regulators, such as for example those described above and in respect of FIG. 3 employing PID controllers, are employed to fill the DUT rapidly and then keep the absolute pressure constant. Such an approach requires unique high flow and fine flow controllers using PID control loops. Accordingly, a high flow regulator closes its loop based upon a gauge pressure sensor to fill the DUT rapidly to a set gauge test pressure. Next a fine flow controller closes a PID loop based upon an absolute pressure sensor wherein the set point of the fine flow regulator is set at the resulting absolute pressure that the high flow regulator reaches. This allows the use of a low flow capability, but precise flow regulator.

By appropriate design and implementation to address factors that impact the multi-stage control loops such as ground loops and noise sources for example, the inventors have established multi-stage pressure control systems that reduce the ripple on the absolute pressure to very low levels (<0.0001 psia for example). The fine flow regulator is implemented with a design having an optimal valve size for low ripple whilst the PID controller provides a gain circuit that integrates noise reduction circuits.

Figure 4:
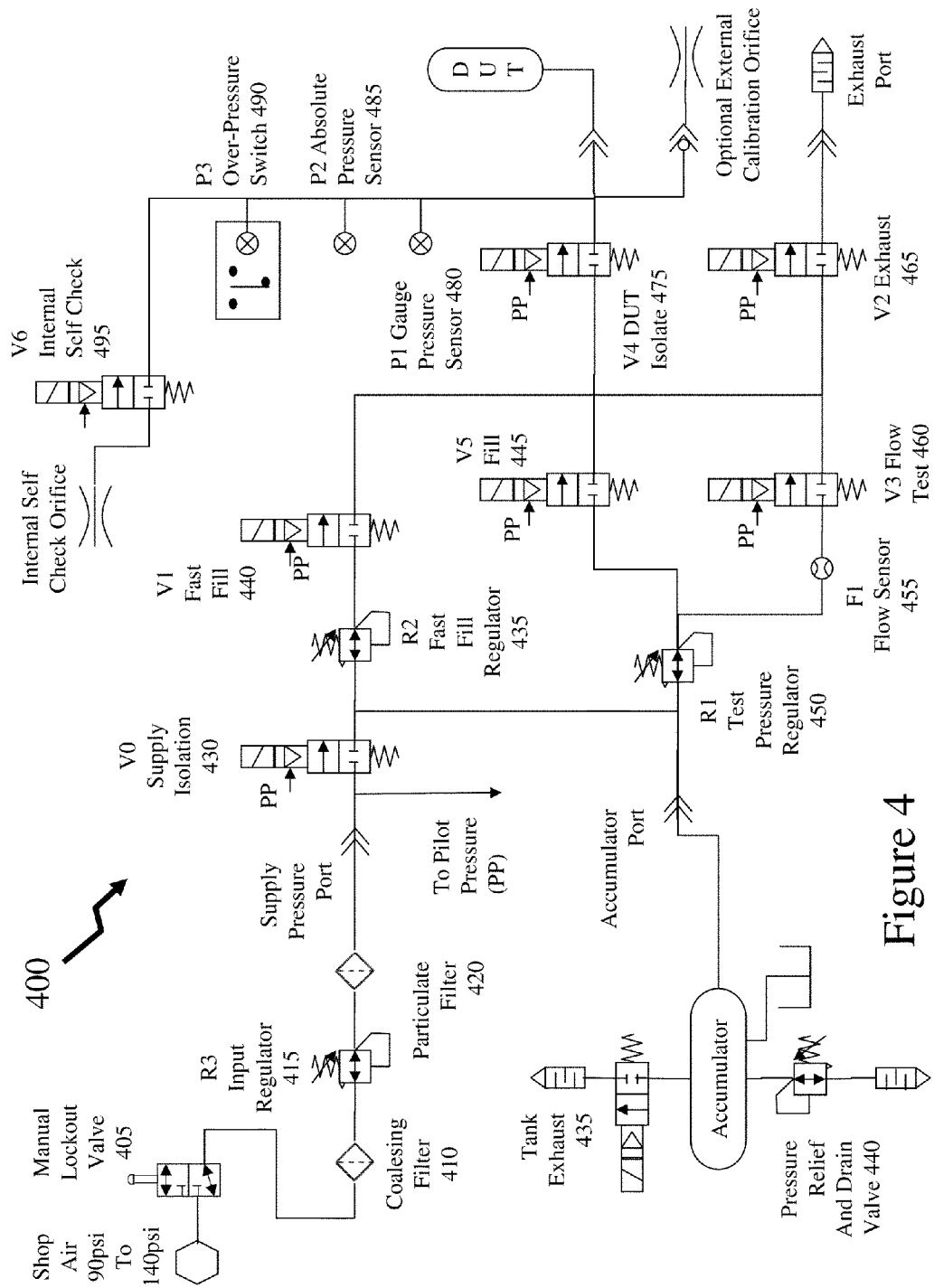
FIG. 4 depicts a pneumatic system according to an embodiment of the invention employing multistage pressure control.

Now referring to FIG. 4 there is depicted an example of a multi-stage pressure control approach according to an embodiment of the invention. Employing this pneumatic electrical circuit to provide the required leak testing may follow the following sequence of steps:
1. Start fast fill of DUT with R2 Fast Fill Regulator 435 at higher gauge pressure to overcome hose resistance;
2. Reduce pressure using R2 Fast Fill Regulator 435 to final gauge test pressure;
3. The current DUT pressure is measured accurately using the absolute pressure sensor 485;
4. Set control set-point for the very fine control absolute regulator R1 Test Pressure Regulator 450;
5. Start fine bypass fill of the DUT using R1 Test Pressure Regulator 450 and V5 Fill 445;
6. Switch to flow testing through V3 Flow Test 460 now the fine regulator R1 Test Pressure Regulator 450 controls the pressure and ensures extremely low ripple in the absolute pressure.
7. The flow can now be measured using F1 flow meter 455

6. Automatic Generation of Parametric Model of Leak CIRCUIT: Traditionally the setup of the many adjustable parameters within a leak test which can include fast fill time, fast fill pressure, fill time, stabilization time, test time and exhaust time for example have been done by trial and error. Different values are tried and adjusted manually based upon the experience of the leak test operator or limited analysis. Some of these durations are shown in the different zones depicted in FIGS. 7A and 7B. In many manufacturing environments the production line leak testing tends to be one of the longer tests that are performed. This puts pressure on finding the optimum adjustment of the leak test parameters to achieve the desired results in respect of accuracy etc with the minimum overall test time.

The manual method of adjustment is prone to inaccuracies for many reasons. The outcome is dependent on the experience of the person setting up the leak test. It takes time to keep testing various setups, and then gather statistical data to determine the repeatability for each setup. There are so many parameters to adjust simultaneously and they all have complex interrelations that it is very challenging to reach the optimum configuration that yields the desired accuracy in the least amount of time.

Figure 5:
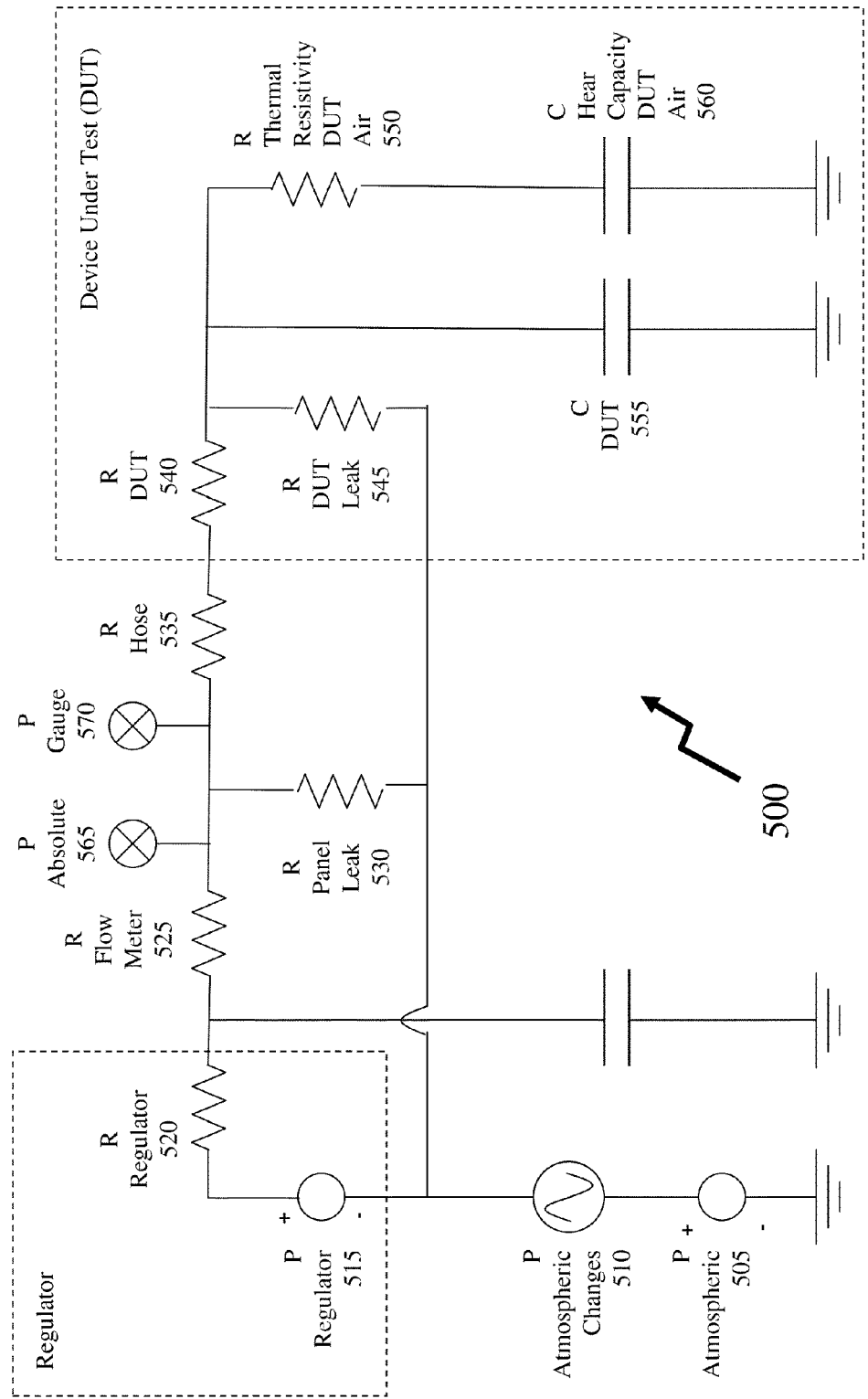
FIG. 5 depicts an exemplary parametric model of a leak circuit for establishing leak rate test parameters according to an embodiment of the invention.

According to embodiments of the invention a leak test system automatically determines these parameters for optimum accuracy with the minimum test time. Various full waveform signature analysis techniques may be used together with different leak test operations and sequences to determine a mathematical model of the tester, part under test and the critical pneumatic pluming. This model is then used to determine the optimum leak test parameter setup that will yield the desired accuracy in the fastest time possible. Accordingly, the pneumatic circuit can be modeled as an electrical circuit such as depicted by equivalent circuit 500 in FIG. 5 wherein flow restricting elements such as valves, hoses, fittings, flow meters, source resistance of regulators, are modeled as resistors, the DUT, hoses and other elements of the system with volume are typically modeled as capacitances, atmospheric changes and input regulator pressure are modeled as voltage sources, and thermal aspects can be modeled as resistors and capacitors representing thermal resistance and capacitance. By applying multiple and various excitations of the leak system overall the model parameters may be calculated from the resulting system responses.

Examples of excitations that may be applied and varied may include, but are not limited to, filling cycles, pressure changes, flow control, and temperature changes. The model can include elements such as regulator, valves, hoses, DUT, leak, adiabatic process, and thermal time constants for example. Such excitations may be automatically generated and the resulting flow rates, pressures, etc. similarly automatically measured wherein these measurements may then be employed as inputs in algorithms which may then be applied to the data to automatically establish parameters for different elements within the leak test system. For example the volume of a DUT may be established using the two processes identified below such that the actual physical volume of the DUT rather than a design value may be employed thereby increasing the accuracy of the measurements.

Process A:
1. Obtain $P_A$ with an absolute pressure sensor;
2. Calculate $\delta^2 P_A$, double derivative of $P_A$;
3. Calculate $\delta F$, single derivative of the flow;
4. Determine the correlation between $\delta^2 P_A$ and $\delta F$;
5. Calculate least squares slope
6. Remove the absolute pressure part and thereby derive the volume of the DUT.

Process B:
1. Change the $P_A$ for the DUT;
2. Measure flow rate F;
3. Calculate net flow, $\int F$, and use this along with the absolute pressure to thereby derive the volume of the DUT.

7. Calculate Optimal Test Parameters from Parametric MODEL: Once, an equivalent parametric model of the leak test system has been established, such as described above in respect of Section 6 and associated FIG. 5 then the derived parametric model may be simulated using one or more predetermined algorithms to determine the response of the parametric model and therein the response of the actual pneumatic circuit to the simulated operation. Accordingly, the parametric model can be used to determine optimal system timings for different aspects of the leak test process including for example fast fill, fill, stabilization, test, and exhaust within the desired overall operating parameters such as overall test time and gauge repeatability and reproducibility.

Accordingly an autotune process comprises the following steps:
A) Controlling the test system with various setups and analyzing the resulting curves with signature analysis to determine the mathematical model, using electrical equivalents, for example, of the test system with the test part;
B) Determining from the mathematical model the optimum test configuration for the accuracy and or time requirements required of the system. This includes the fast fill pressure and time, fill time, stabilization time, test time and exhaust time.

C) Chose the ideal system setup using the model to optimize the accuracy and reduce time of the leak test D) Determine the leak of the part.

In many configurations within the prior art determining the leak was based upon assumptions and best practice scenarios rather than experimental data. According to embodiments of the invention the measurements and parameter setup of DUTs for leak rate may be fully automated thereby allowing rapid adjustment in the DUT measured at a leak test station within a production environment as well as optimizing the test time and test determinations.

Determining DUT Leak: Usually a leak tester is periodically checked using a master leak rate unit to ensure that the unit is within calibration. However, if the leak rate master unit is permanently connected to the leak test system then an initial measurement of the leak rate master unit allows for a verification step to be included within the test to ensure that the settling and adiabatic heating times are over. The measurement of the leak rate will then indicate the leak of the system as a whole including the DUT. The leak of the tester is known so the leak of the DUT and hoses can be found.

Determine DUT Volume: Systems are typically calibrated with a known leak standard as discussed above on a periodic basis for calibration verification. However, according to embodiments of the invention this leak rate master unit can be used to find the volume of the DUT thereby allowing the actual volume of the part to be determined and employed in leak rate determinations rather than using a design value derived from the engineering part.

Stabilization Step Removal: As noted above the stabilization step of leak test processes can a significant portion of the overall leak testing process cycle time. If this effect is consistent then a model of this curve can be developed and can be subtracted from the original flow or pressure decay to yield the flow or pressure decay curves that are only due to the leak of the part not including the adiabatic process. Accordingly, this would allow for faster leak rate determination by allowing this to be performed earlier without requiring stabilization wherein the determination may be made for example at a predetermined point in time or after a particular condition has been met. An example of a process sequence according to an embodiment of the invention would be:

1. Run a representative part several times in a row capturing the entire pressure and/or flow curves.
2. Align the curves using significant attributes, for example threshold crossing at certain value for example, to remove any timing variations.
3. Perform mathematical processing to develop a nominal curve based on a point by point statistical analysis.
4. Save the nominal curve into memory.
5. During subsequent leak tests perform the alignment process on the new test data.
6. Subtract the nominal curve from the new test data.
7. Determine the leak rate from adjusted test data.
8. Automatic Calibration in Tank to Tank Leak System: In a Tank to tank flow base leak test system the source of the air is a sealed tank that was filled to the same pressure as the DUT wherein a flow meter is disposed between the tank and the part. Accordingly if the DUT leaks some air comes out of the DUT and hence some out of the supply tank. The flow meter therefore only measures the flow out of the tank which is a portion of the actual part leak. In order to know the true part leak from the flow meter measurement the DUT volume needs to be known.

Accordingly employing the automatic parametric methods discussed above in respect of embodiments of the invention then if these are applied to each cycle to determine the DUT volume then the actual leak rate can be known without having to know the DUT volume prior to the measurements. This therefore makes leak testing using the tank to tank method one of reduced complexity, increased accuracy and removes the requirement for a calibration and according calibration time for each type of DUT.

9. Calculate Optimal Test Parameters from Sample Data: Typically a leak test comprises a series of stages, such as for example, fill, stabilize, test and exhaust. Typically the values of these are established based upon subjective assessments of measurement characteristics or simulations. However, the inventors have found that some aspects of a test may be determined from statistical analysis of a multiple experiments such as for example stabilization time and test time. According to an embodiment of the invention a leak test has been established as having a known end time of 2.7 seconds wherein the following procedure is executed:

1. Take various samples of data for a leak test;
2. Vary the test zone from the fill time end (0.5 seconds) to the test end (2.5 seconds)
3. Calculate the mean leak and the standard deviation at each point;
4. Plot the results
5. Chose the point that has the lowest standard deviation for the time to start the test zone.

Figure 7B:
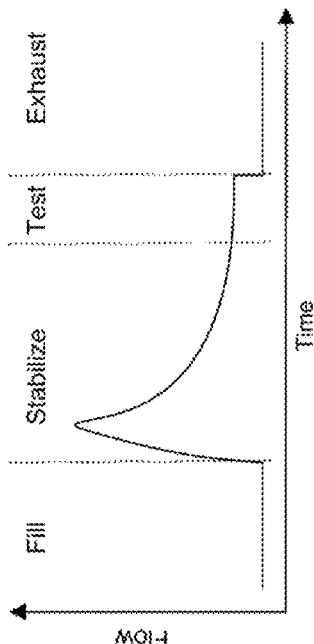
FIGS. 7A and 7B depict schematics of an overall leak rate test cycle for pressure decay and flow testing respectively.
Figure 7A:
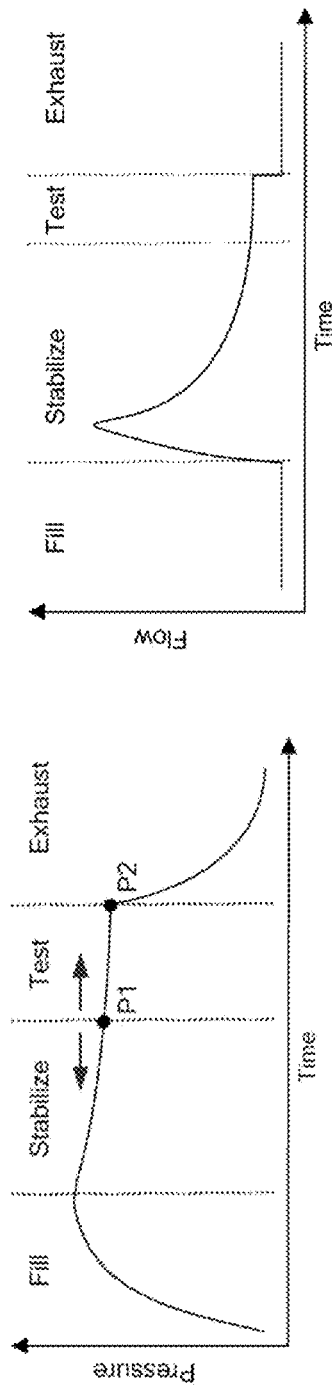
Figure 6:
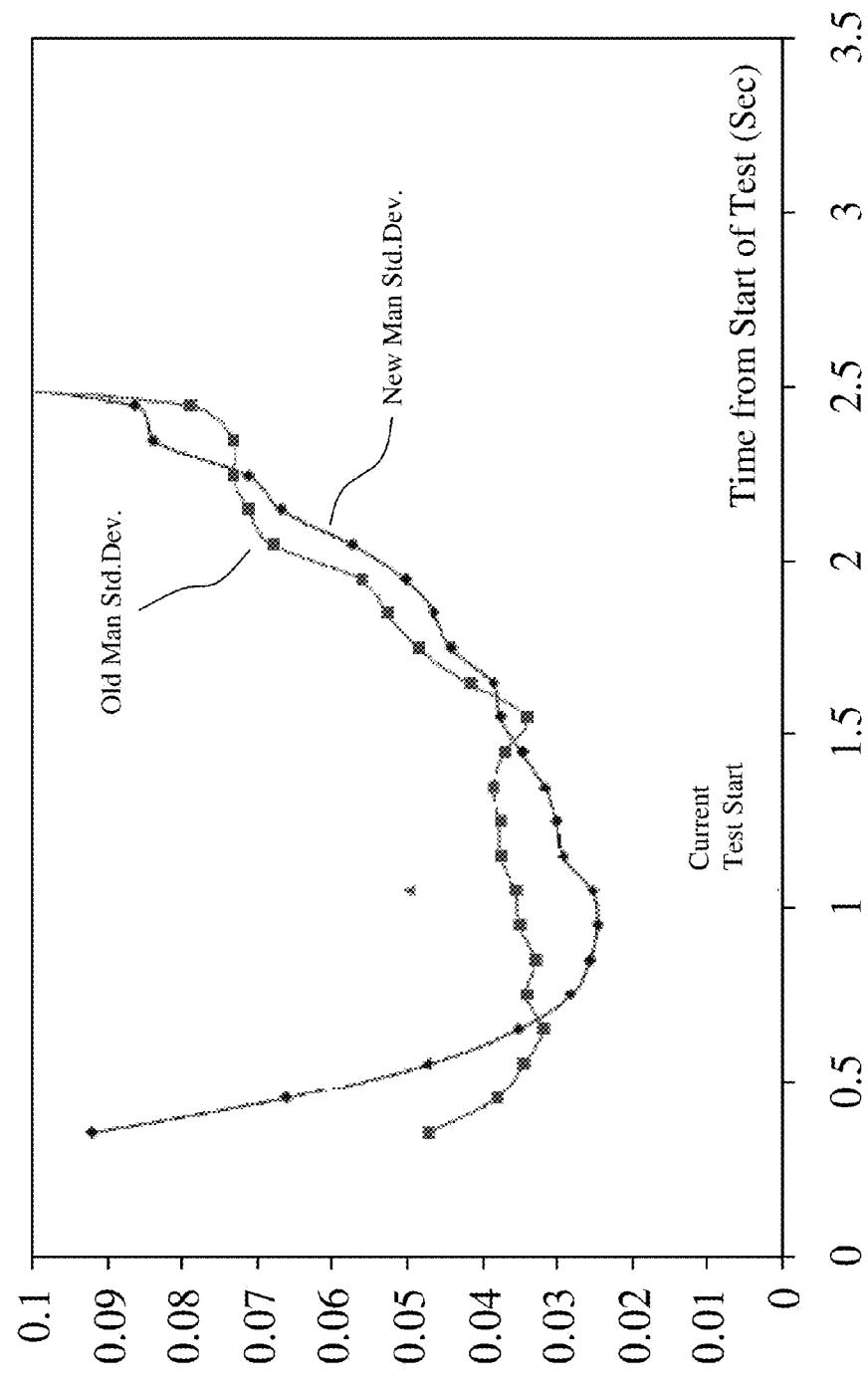
FIG. 6 depicts a plot of leak test error versus test phase start time indicating the determination of an optimal start time for leak rate tests according to embodiments of the invention.
Figure 8:
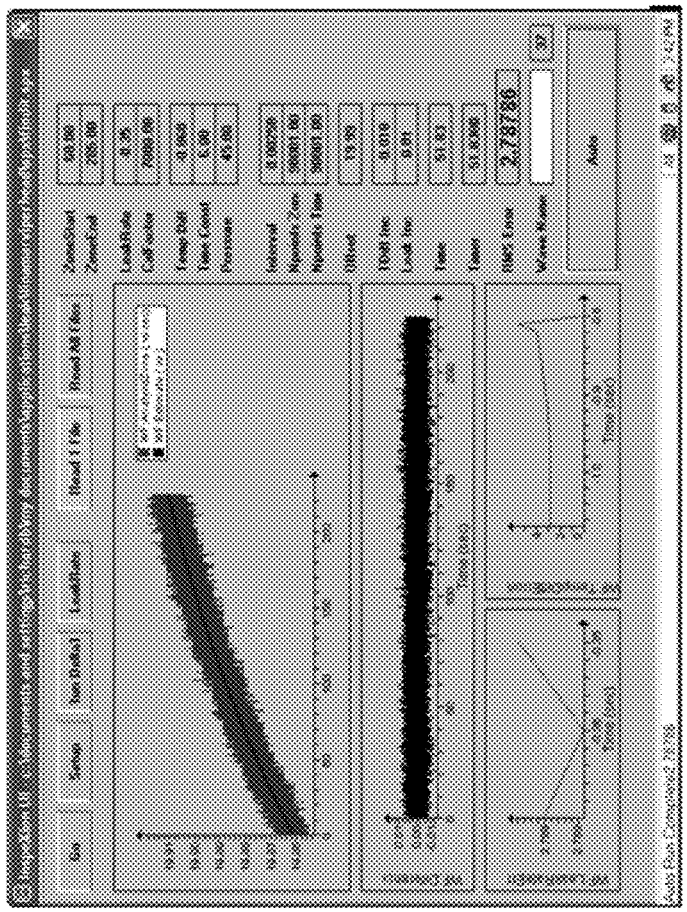
FIG. 8 depicts a screen shot from an automated leak rate system according to an embodiment of the invention.
Figure 9:
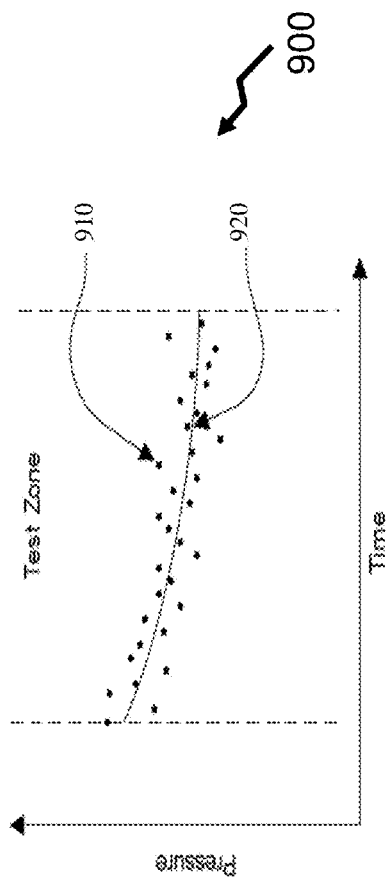
FIG. 9 depicts applying signature analysis to a leak rate measurement according to an embodiment of the invention.

An exemplary plot of such a test protocol is depicted by FIG. 6 wherein the plot presents the standard deviation of a test with fixed total test time against the test start time indicating that a minimum exists at approximately 1.1 seconds wherein the test time can be seen as part of the overall process in FIG. 7A.

10. Fit Curves to Leak Profile: In many instances leak rate tests are performed at a single discrete point in time or after a predetermined period of time where multiple measurements are performed with subsequent averaging. However, the inventors have established leak testers with high accuracy and fast data acquisition such that data may be extracted from the test at high data rates thereby allowing the leak profile to be tracked in real time such that a mathematically defined curve may be fitted to the evolving leak profile thereby increasing accuracy, reducing test times and allowing final leak data to be predicted.

For example FIG. 7B depicts the results from a leak test system according to an embodiment of the invention such as depicted above in respect of FIGS. 3 and 4 wherein a flow curve versus time is shown wherein a mathematical model, for example an exponential, is applied to the data to determine the parameters by fitting the curve of the equation using the raw data. Accordingly, these parameters may then be used for example to increase accuracy or predict final leak rate before stabilization.

11. Temperature Compensation Using Rate of Change of Flow/Pressure: Within leak rate testing DUT temperature changes may impact directly the testing such as for example if the DUT was heated in a previous process, i.e. high temperature washing, this results in a heating of the DUT such that subsequent cooling causes a flow into the DUT which is measured and attributed incorrectly to a leak within the DUT. Accordingly the inventors have established a protocol for determining the effects on the leak curve due to the temperature rate of change of the DUT from the rate of change of the flow or pressure decay curve only. As the DUT cools the rate of change of the DUT temperature reduces such that with a high speed leak tester measurements can be made that allow this rate of change to be determined and therein from this the DUT temperature may be established. The duration over which the flow and/or pressure are sampled is set long enough for this to be determined.

Figure 10:
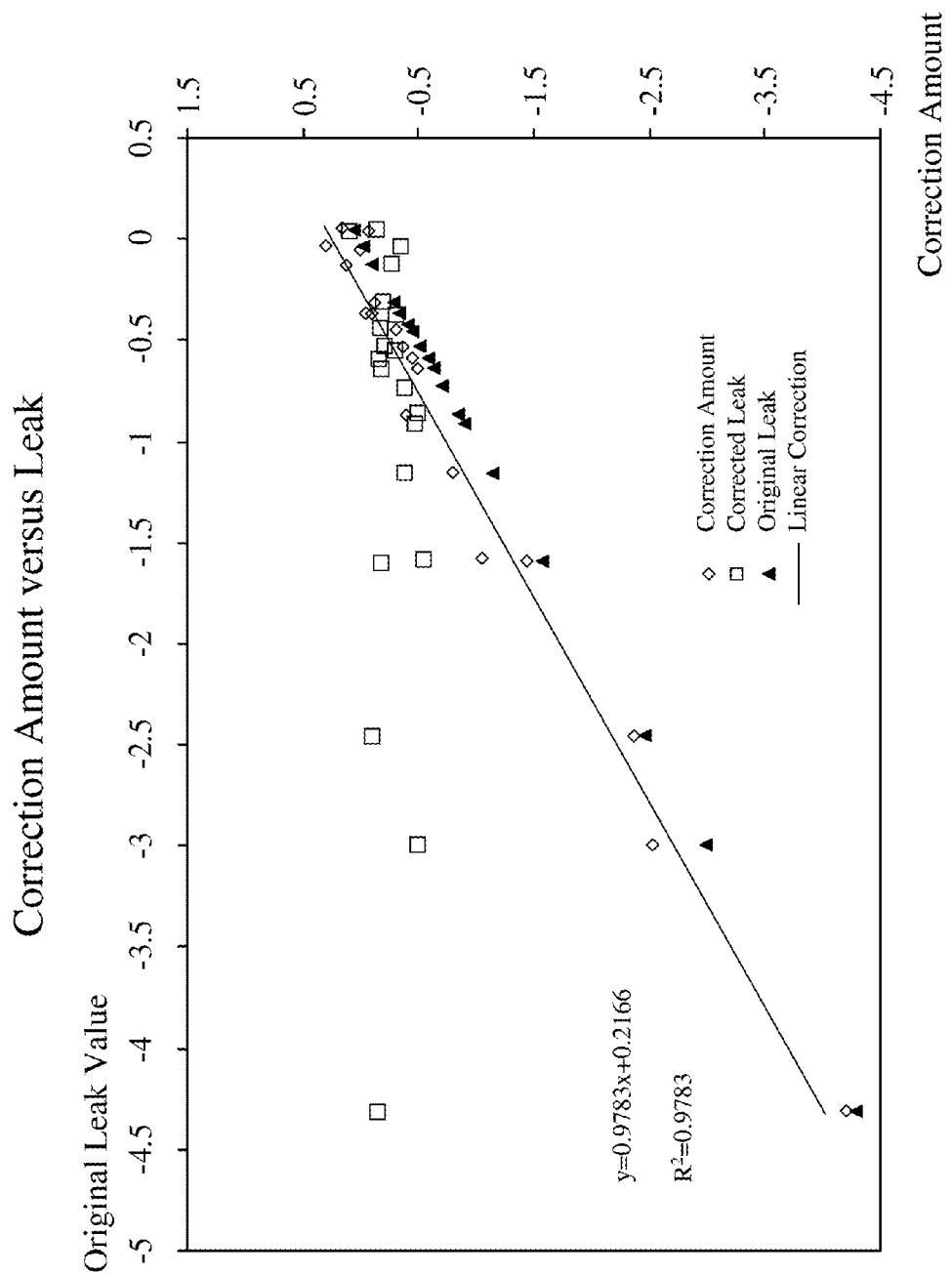
FIG. 10 depicts a corrected leak rate and original measured leak rates as the result of temperature compensation according to an embodiment of the invention.
Figure 11A:
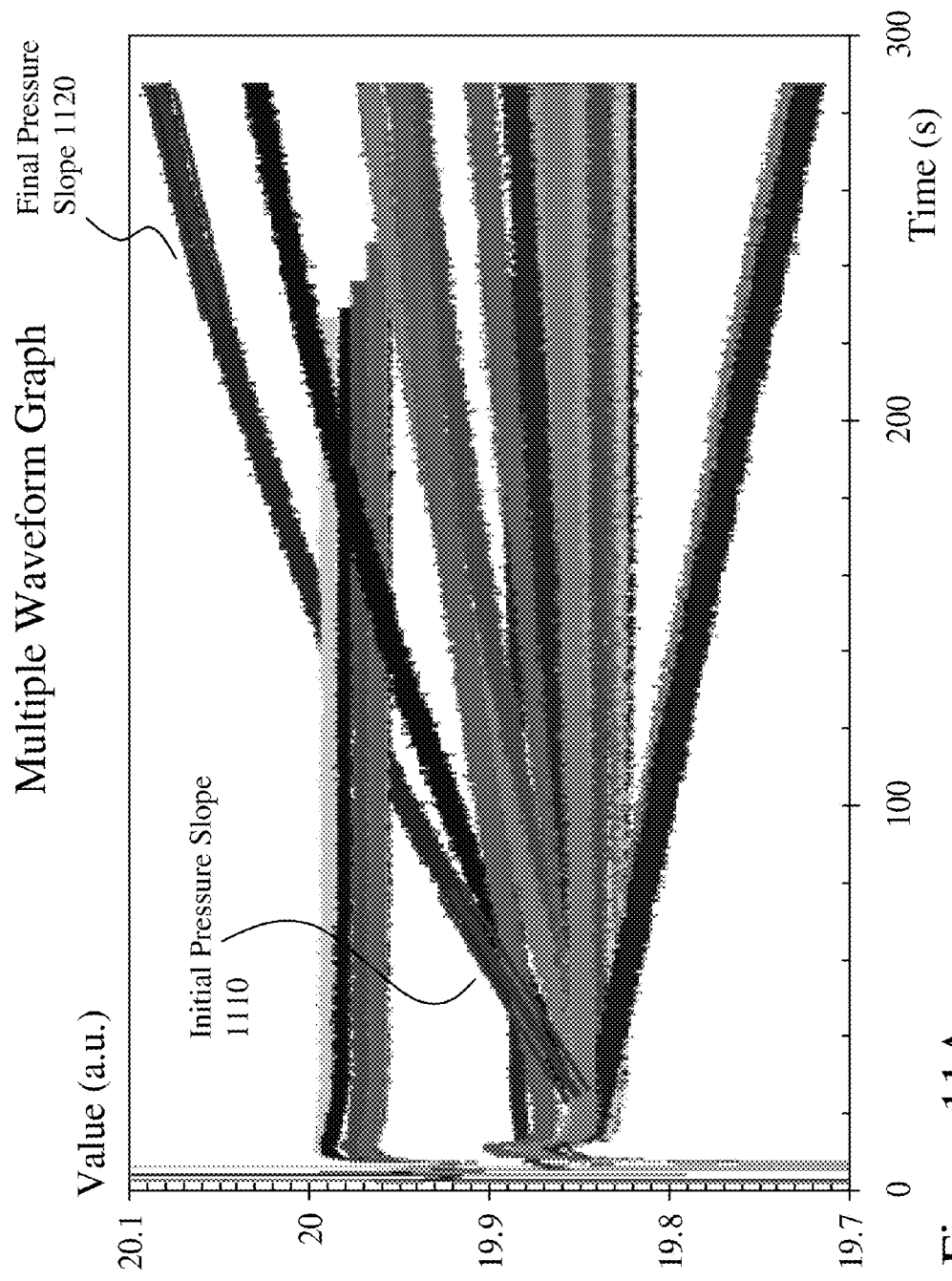
FIGS. 11A and 11B depict establishing a DUT's temperature from the rate of change of flow in a pressure decay curve according to an embodiment of the invention.

Referring to FIG. 10 there is depicted a plot of corrected leak rate versus original leak value based upon a measured temperature change whereas FIG. 11 depicts a plot of pressure vs. time curves for different initial DUT temperatures. The change in slope is highlighted for one DUT with initial pressure slope 1110 and final pressure slope 1120.

Figure 11B:
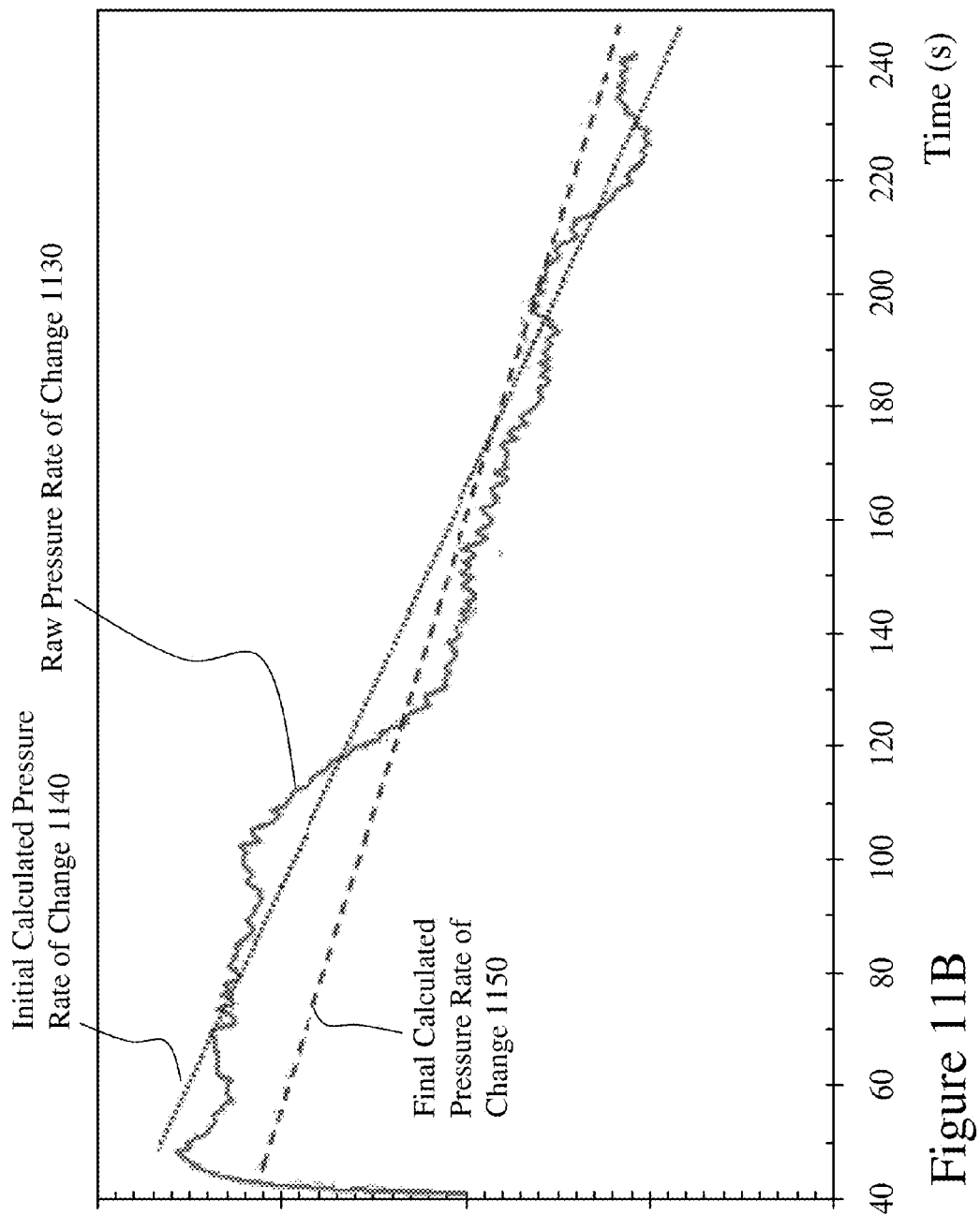

Least squares slope may, for example, be used to determine the pressure rate of change. The rate of change of the pressure slope (double derivative) is proportional to the temperature difference between the DUT and atmospheric or test stand temperature. The greater the difference in temperature the greater the difference in rate of change of the slope of the pressure. This value can then be used to determine the part temperature and remove the temperature effect as shown in the resulting corrected leak rate values in FIG. 10. Referring to FIG. 11B the rate of change of pressure slope versus time for a DUT is depicted as raw pressure rate of change 1130 together with the initial and final calculated pressure rates of change 1140 and 1150 using least squares fits to the initial and latter portions of raw pressure rate of change 1130.

Figure 12:
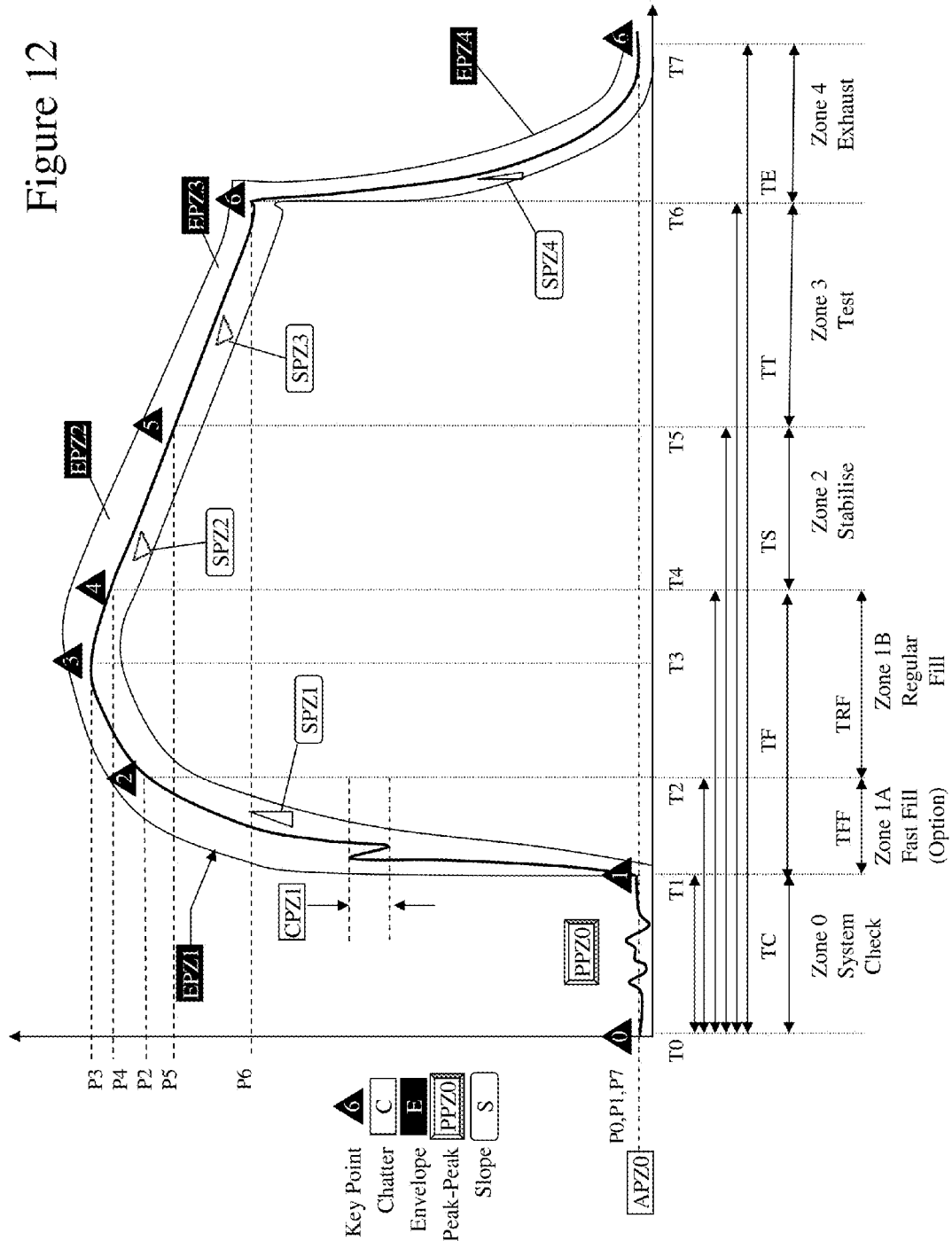
FIG. 12 depicts a pressure versus time waveform as exploited by a full curve analysis leak tester according to an embodiment of the invention.

12. Signature Analysis of Entire Leak Curve: Within the prior art a leak test is performed once a series of previous steps have been completed such as fill and stabilization. However, the inventors have established a process to scientifically analyze the entire pressure-time curve of a pressure-decay or flow leak test with signature analysis in order to extract all the information that can be obtained from each unique part of the waveform and by using as many continuously sampled points as possible. FIG. 12 shows examples of some of the parameters that are the result of full waveform analysis and which can be applied to not only leak testing as a qualification step but also subsequently retrieved in the event of any subsequent defect analysis of the DUT or subsequent assemblies and/or systems exploiting the DUT.

For example instead of only measuring the start and end pressure during the test time the invention uses a continuous stream of measurements taken during the test time. The information from all these points is used to compute a much more reliable determination of the leak rate. This results in greater accuracy and faster leak tests. Accordingly embodiments of the invention apply signature analysis to all parts of the pressure-time curve to obtain additional information about the test chamber and the test apparatus such as the status of the air regulators, valves, pressure transducer, connection to test chamber etc. For example the status of the hoses connected to the test chamber can be determined by measuring the rate at which the DUT exhausts the air that was at the test pressure through the exhaust valves.

For example, referring back to FIG. 7A a pressure decay leak test within the prior art is performed by filling a DUT with air and then measuring the pressure at two different points in time, $P_1$ and $P_2$. The size of the leak in the DUT should then inferred by the difference between these two measured pressures and the time between them. Examples of such a prior art approach are Delatorre et al in U.S. Pat. No. 3,800,586 and Martin et al in U.S. Pat. No. 5,847,264. However, this type of analysis suffers from a common measurement problem in that the practical reading of electrical transducers has some degree of uncertainty, due to electrical noise or other inaccuracies, so that simple two point measurements are prone to error. Also there is additional information in the entire waveform or curve that is not being used and within each zone of the overall leak test profile depicted in FIGS. 7A and 7B respectively information is present with respect to different paths for the air within the pneumatic leak test circuit and accordingly each zone and combinations of zones can provide additional and different information regarding the test and the status of the leak test system.

Figure 13:
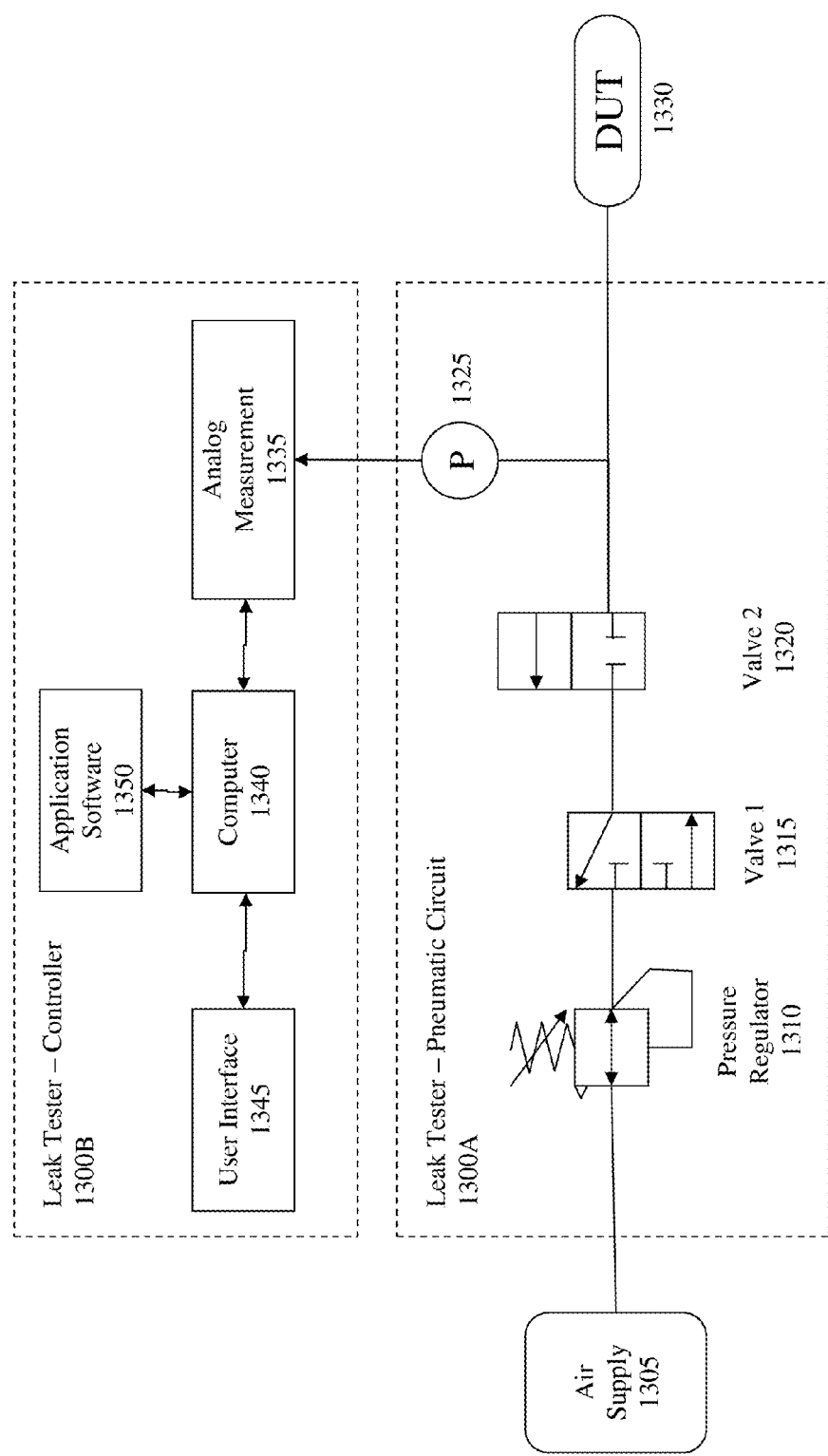
FIG. 13 depicts a schematic of a system to applying signature analysis to the leak testing process according to an embodiment of the invention.

Accordingly embodiments of the invention relate to scientifically analyzing the entire pressure-time curve of a pressure decay or flow leak test with various combinations of signature analysis techniques for all the information that can be obtained from each unique part of the waveform and by using as many continuously sampled points as possible for each analysis. Within the following discussion the approach of signature analysis for the entire leak test cycle from beginning to end (referred to as the entire leak curve) are presented with respect to an exemplary leak tester setup depicted in FIG. 13 which shows a typical pressure decay leak test setup with air supply 1305, pressure regulator 1310, dual valve arrangement comprising Valve 1 1315 and Valve 2 1320, pressure transducer 1325 and DUT 1330. Referring to FIG. 7A each zone represents different states of the test chamber and the controlling valves wherein the status of each element within the Leak Tester—Pneumatic Circuit 1300A are presented

TABLE 2

System State Table

| State | Zone | Valve 1 | Valve 2 | DUT |
|---|---|---|---|---|
| System Check | 0 | A | A | At Atmospheric |
| Fill | 1 | B | B | Filling |
| Stabilize | 2 | A | A | At Test Pressure/Leaking |
| Test | 3 | A | A | At Test Pressure/Leaking |
| Exhaust | 4 | A | B | Exhausting |

Figure 14:
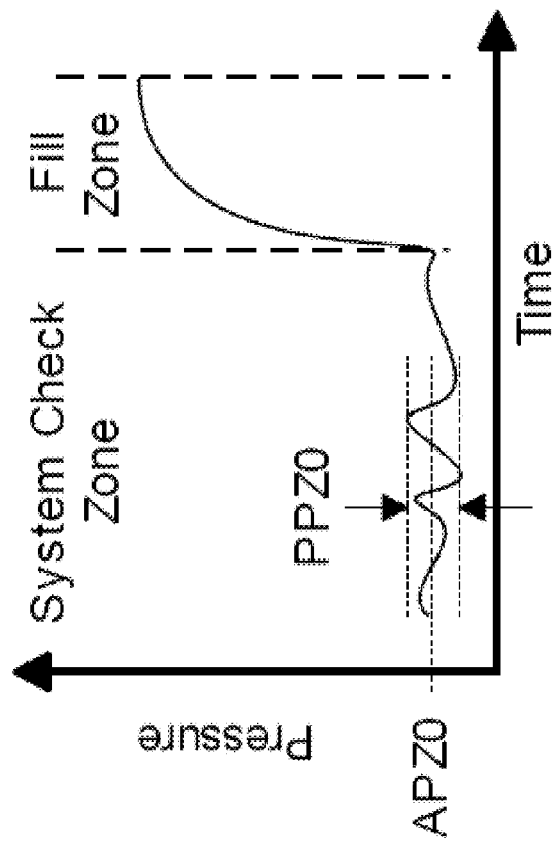
FIG. 14 depicts applying signature analysis the very beginning of the pressure curve to detect unique leak tester and DUT defects like sensor noise and offset according to an embodiment of the invention.

12A. System Check: Before the fill cycle even begins some system checks can be performed to validate the state of the sensors wherein the outputs of the transducers are collected for a small period of time and then analyzed using the Leak Tester—Controller Circuit 1300B for example comprising analog measurement circuit 1335, computer 1340, user interface 1345, and application software 1350. Accordingly FIG. 14 shows the system check zone before the fill zone wherein within this exemplary embodiment the peak to peak variation, PPZ0, and the average of the waveform, APZ0 are measured. The peak to peak variation PPZ0 may indicate excessively noisy sensors, faulty excitation of sensors, bad wiring or valve problems for example. The average APZ0 may indicate a damaged sensor, i.e. one that was over-ranged, or faulty valves that are not seated properly. Initially the thresholds for these two parameters may be established during the execution of the multiple parametric excitation sequences such as described above in respect of Sections 6 and 7 for example. Alternatively, these thresholds may be based upon manufacturer information relating to the particular sensor(s) employed within the leak test system.

Other system checks that can be performed using a fully automated leak tester during the execution of a test cycle include for example analysis relating to the maximum fill pressure, actual test zone start pressure and end exhaust pressure for example. The maximum fill pressure and actual test zone start pressure may for example indicate incorrect regulator setting(s) for the fast fill pressure or the fill pressure, incorrect supply line pressure, regulator functionality issues, supply line hose integrity, gross defects, wrong part etc. The exhaust zone end pressure can indicate debris in hoses, kinked test port hoses or valve malfunctions for example.

12B. Fill Zone—Pressure Chatter: It would be evident that certain DUTs to be tested have internal sub-components and/or sub-assemblies that can move wherein this movement is not desirable. For example a DUT being tested may have O-rings within it to form the seals wherein these O-rings may roll during the fill portion of the cycle as pressure differentials and pressure increases occur during this fill portion. When this happens there is a sharp reduction in the fill pressure due to the sudden movement of the O-rings. Other DUTs may have spool valves which are example of a moving sub-component that can move but in this instance move in a smooth way. If it is sticky the movement will be quick and uneven. Other examples can be debris that becomes dislodged during the fill cycle or the face seals of the leak apparatus are themselves deteriorating. However, such information is not present in a prior art leak test but is present within a full curve analysis. Accordingly to detect these sudden changes or discontinuities the fill portion of the pressure-decay versus time waveform can be processed to generate an indication of the dynamic change in pressure versus time. Accordingly this new waveform can be processed in order to determine maximum and peak-peak values for example which can then be employed to indicate whether movement within the DUT occurred during the fill.

$$\frac{dP_n}{dt} = \frac{P_n - P_{n-1}}{\Delta t} \quad (2)$$

Figure 15:
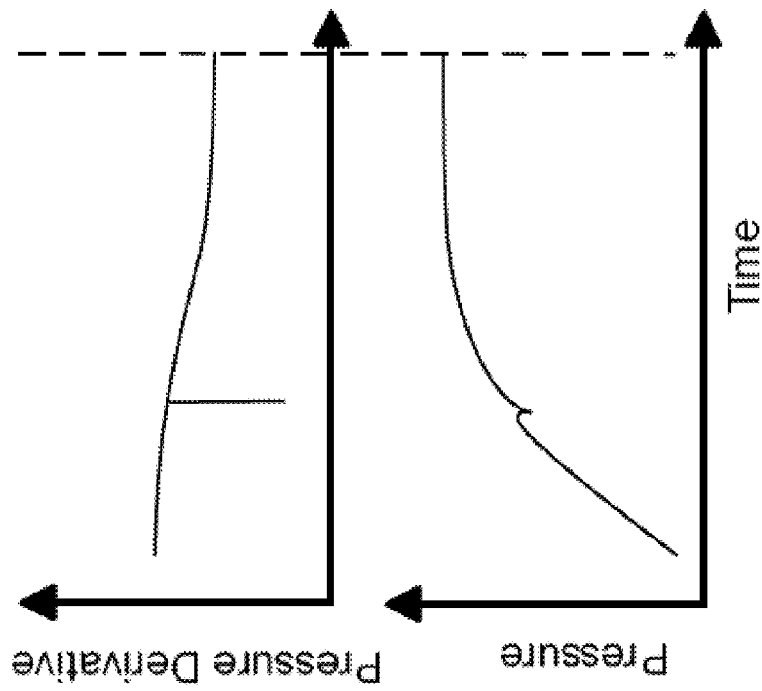
FIG. 15 depicts applying signature analysis to a portion of the pressure curve to detect unique DUT defects like seal movement according to an embodiment of the invention.

The pressure derivative determined from Equation (2) is a new waveform that is generated by taking the difference between two adjacent pressure samples and dividing this by the sample interval. If the minimum of this pressure derivative waveform is taken then this can represent the amount of movement of parts inside the test chamber. This is noted as CPZ1 for Chatter Pressure in Zone 1 in the full curve profile presented in FIG. 12. Referring to FIG. 15 it can be seen how the pressure derivative clearly identifies such chatter within the DUT relative to the raw pressure versus time data. The processing applied to the resulting pressure derivative can be as simple as high/low limits with triggers to determine if the DUT has acceptable movement or not. Even where limits cannot be initially established except through trial-and-error or are established based upon field data of DUTs then such data can be obtained for every piece part to establish a database from which such limits may be derived or where limits are subsequently determined to identify particular DUTs for further monitoring or recall for example.

12C. Fill/Exhaust—Slope: The fill and exhaust portions of the curve can also be analyzed to detect any anomalies in the part such as kinked hoses, reduced/expanded volume, missing parts, blockages in DUT i.e. transmission housing, and gross leak for example. Some of the part of the curves can be modeled by exponential rise or fall so that a least squares curve fit to an exponential can yield good results. Equation (3) shows the basic form of the equation and FIG. 16 depicts an example of how it fits in the fill zone. Regulators and pneumatic devices exhibit nonlinear effects but these can be molded using the combination basic elements. This represents a combined factor of the test volume, the resistance of the connection to the test volume, and any leaks of system and part. The test volume is the combination of the leak tester test port volume, volume of connection hoses to the part and the volume of the part under test. The resistance to fill is a combination of the air source resistance, regulator, valves, tubes and pluming associated with getting the air into the chamber. The resistance for the exhaust is a combination of the connection hoses, valves and the exhaust pathways leading the air out of the part to the atmosphere.

$$P\text{fall}(t) = P\text{start} * e^{-t/\tau} \quad (3)$$

where P(t) is pressure at time t, $P_{FINAL}$ is the final pressure, and $\tau$ is the time constant of the fill process.

This slope or the time constant $\tau$ will be affected by any of the above mentioned defects or issues. For example, if the DUT is a brake line for a vehicle and the hose is kinked the pressure measured by the tester will rise faster than it should for a good DUT. The pressure in the part will rise slower, but the tester is measuring pressure before the block so will see a faster rise in pressure than if there was no kink. Limits can be set by testing initial populations of known good parts and bad parts and noting the change in these slope features.

12D. Test Zone—Slope: As noted above a leak test according to the prior art during the test portion of the pressure curve measures two points, one at the beginning and one at the end, and therein a leak rate calculated. However, with full waveform signature analysis continuous sampling is performed along the test portion of the curve and these data points may be used to develop a best fit exponential slope using a least squares technique on the basis that the pressure profile will be an exponential decay from the starting pressure to ambient pressure (see FIG. 17). This mathematical processing improves the accuracy of the measurements by filtering measurement noise out and provides for reduced test as discussed below in Section 12E. The processing may employ the same Equation (3) above.

12E. Test Zone—Early Rejection: Typically a leak tester according to the prior art must wait the prescribed test time and then performs the calculation based upon the start and end pressures of the test zone to determine the pass/fail status of the DUT. However, with full waveform signature analysis continuous sampling is undertaken and these additional points are all used so accuracy is increased but also with the increased accuracy early prediction becomes possible. According to an embodiment of the invention the leak test system may periodically extract the portion of the test pressure waveform that is available at that point and execute mathematical processing on it thereby generating a prediction on the final result as shown in FIG. 17. This final result prediction as well as the current data portion of the test zone is compared against predetermined limits. Accordingly, based upon early samples a prediction of a probable failure may be determined which upon reaching a predetermined level of confidence results in the DUT being deemed as a failure at that time, thus saving valuable production time as the complete test cycle is not required. Alternatively parts may also be deemed to pass at earlier test times where the confidence levels of the predications are high. In this manner only parts with leak rates that are essentially borderline require completion of the full test zone element of the test profile.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in some instances as electronic circuits which may comprise hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of leak testing a device under test (DUT) comprising the steps of:
   a. filling the DUT with a fluid to a predetermined pressure using a first regulator and a first valve disposed in series between a source of the fluid and the DUT;
   b. measuring with a high accuracy flow controller a measured flow waveform; and
   c. calculating with a microprocessor a leak rate for the DUT in dependence upon at least the measured flow waveform;
   wherein at least one of a first set of characteristics and a second set of characteristics were established using a process comprising the steps of:
   automatically operating a leak test system comprising at least an absolute test pressure sensor measuring the fluid pressure in proximity to the DUT, the high accuracy flow controller for controlling fluid provided to the DUT, and a controller processing the output of the absolute pressure sensor to generate a setting for the high accuracy flow controller;
   automatically executing a predetermined subset of test sequences of a plurality of test sequences with the leak test system;
   storing in a memory associated with a computer a plurality of measurements taken during each test sequence of the predetermined subset of test sequences of a plurality of test sequences;
   automatically determining in dependence upon a predetermined portion of the plurality of measurements at least one characteristic of a plurality of characteristics, each characteristic relating to at least one of the leak test system, the DUT, and an overall test time for performing a leak test to a predetermined specification.

2. The method of leak testing a DUT according to claim 1 wherein, at least one of the first set of characteristics and the second set of characteristics were established using a process comprising the steps of:
   automatically operating a leak test system comprising at least the absolute test pressure sensor P1 measuring the fluid pressure in proximity to the DUT, the high accuracy flow controller F1 for controlling fluid provided to the DUT, and a controller processing the output of the absolute pressure sensor to generate a setting for the high accuracy flow controller F1;
   automatically executing a predetermined subset of test sequences of a plurality of test sequences with the leak test system;
   storing in a memory associated with a computer a plurality of measurements taken during each test sequence of the predetermined subset of test sequences of a plurality of test sequences;
   automatically establishing an equivalent electrical circuit model of the leak test system and DUT in dependence upon at least the plurality of measurements;
   automatically determining in dependence upon a predetermined portion of the plurality of measurements at least one characteristic of a plurality of characteristics, each characteristic relating to performing a leak test to a predetermined specification and established in dependence upon the equivalent electrical circuit model.

3. The method of leak testing a DUT according to claim 1 wherein, step (b) further comprises correcting the measured flow waveform for adiabatic processes impacting the DUT during a test sequence of which step (b) forms part, the correction being determined by establishing a nominal curve for the DUT through the steps of:
   (i) executing a plurality of leak test sequences of a single design on a plurality of DUTs and storing at least one of the entire pressure curve and the entire flow curve as their measured flow waveform;
   (ii) temporally aligning the plurality of measured flow waveforms using at least one significant attribute of the plurality of measured flow waveforms; and
   iii) statistically processing the plurality of aligned measured flow waveforms to Establish the nominal curve.

4. The method of leak testing a DUT according to claim 3 wherein, correcting the measured flow waveform for adiabatic processes impacting the DUT comprises:
   (iv) performing an alignment process on the new test data for the DUT under test;
   (v) subtracting the nominal curve from the new test data; and
   (vi) using the adjusted test data to determine the leak rate.

5. The method of leak testing a DUT according to claim 1 further comprising;
   filling a tank with the fluid to the same predetermined pressure as the DUT, wherein the tank and DUT are fluidically linked and the high accuracy flow controller F1 is disposed within the fluidic link between the tank and DUT.

6. The method of leak testing a DUT according to claim 5 further comprising;
   automatically performing an automatic parametric process as part of the leak testing process to determine the specific volume of each DUT tested.

7. A method of leak testing a device under test (DUT) comprising the steps of:
   a) establishing a leak test protocol comprising at least a first set of characteristics related to the filling of the DUT with a fluid under pressure or the stabilization of the pressure in the DUT, a second set of characteristics related to testing for leaks in the DUT, and a third set of characteristics relating to exhausting the fluid from the DUT;
   b) preparing the DUT with a fluid to a predetermined pressure using a first regulator and a first valve disposed in series between a source of the fluid and the DUT via a first process sequence comprising the first set of characteristics;
   c) measuring with a high accuracy flow controller a measured flow waveform via a second process sequence comprising the second set of characteristics;
   d) performing an exhaust process to allow replacement of the DUT; and
   e) calculating with a microprocessor a leak rate for the DUT in dependence upon at least the measured flow waveform.

8. The method of leak testing a DUT according to claim 7 wherein,
   steps (b) and (c) are performed concurrently; and
   step (c) further comprises applying a mathematical model to the measured flow waveform in order to at least one of predict the DUT leak rate and terminate the leak rate measurement if the measured flow waveform exceeds by a predetermined amount the modeled flow waveform for a DUT at the limit of acceptable leak rate.

9. A method of leak testing a device under test (DUT) comprising:
provuding a leak testing pneumatic circuit comprising at least an inlet for connection to a source of fluid, a pressure regulator, a first valve coupled to the regulator and a second valve, a pressure sensor coupled to the output of the second valve, and an outlet coupled to the output of the second valve for coupling to the DUT;
executing a leak test sequence for a DUT by cycling the first and second valves through a predetermined sequence to selectively perform at least one of a system check, filling the DUT with the fluid under pressure, stabilization of the pressure in the DUT, testing for leaks in the DUT, and exhausting the fluid from the DUT; wherein
the output of the pressure sensor is continuously acquired by a microprocessor to perform a full flow waveform analysis as part of a quality assurance step for the DUT;
wherein the leak test sequence is established according to a process comprising the steps of:
executing a predetermined test sequence of a plurality of test sequences with the leak testing pneumatic circuit;
storing in a memory associated with a computer a plurality of measurements taken during a predetermined portion of the predetermined test sequence;
determining in dependence upon a predetermined portion of the plurality of measurements at least one characteristic of a plurality of characteristics, each characteristic relating to the leak testing pneumatic circuit and the DUT.

10. The method of leak testing a DUT according to claim 9 wherein,
during a system check step of the leak test sequence statistical analysis of the pressure sensor output waveform is performed to assess whether at least one of the average and peak-to-peak variation of the output waveform exceed predetermined thresholds which are indicative of a fault condition of the leak test pneumatic system.

11. The method of leak testing a DUT according to claim 9 wherein,
during the leak test sequence transient analysis of the pressure sensor output waveform is performed to assess at least one of whether an element forming part of the DUT moved during the test and the movement exceeded an acceptable limit.

12. The method of leak testing a DUT according to claim 9 wherein,
during at least one of the filling step and the exhaust step of the leak test sequence analysis of the pressure sensor output waveform is performed to detect an anomaly within at least one of the leak test pneumatic system and the DUT.

* * * * *